(12) United States Patent
Elzur

(10) Patent No.: US 7,397,800 B2
(45) Date of Patent: *Jul. 8, 2008

(54) METHOD AND SYSTEM FOR DATA PLACEMENT OF OUT-OF-ORDER (OOO) TCP SEGMENTS

(75) Inventor: Uri Elzur, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 937 days.

This patent is subject to a terminal disclaimer.

(21) Appl. No.: 10/652,270

(22) Filed: Aug. 29, 2003

(65) Prior Publication Data

US 2004/0133713 A1 Jul. 8, 2004

Related U.S. Application Data

(60) Provisional application No. 60/484,180, filed on Jul. 1, 2003, provisional application No. 60/456,260, filed on Mar. 20, 2003, provisional application No. 60/407,165, filed on Aug. 30, 2002.

(51) Int. Cl.
*H04L 12/56* (2006.01)
*H04J 3/24* (2006.01)

(52) U.S. Cl. .................... 370/394; 370/473; 370/474

(58) Field of Classification Search ............ 370/389, 370/394, 395.52, 412, 428, 429, 465, 473, 370/474
See application file for complete search history.

(56) References Cited

U.S. PATENT DOCUMENTS

| 5,699,361 | A | 12/1997 | Ding et al. |
| 6,246,684 | B1 | 6/2001 | Chapman et al. |
| 6,434,620 | B1 | 8/2002 | Boucher et al. |
| 6,453,357 | B1 | 9/2002 | Crow et al. |
| 6,779,056 | B2 | 8/2004 | O'Neill et al. |
| 6,781,992 | B1 | 8/2004 | Rana et al. |
| 6,804,815 | B1 * | 10/2004 | Kerr et al. .................... 718/100 |
| 6,937,606 | B2 | 8/2005 | Basso et al. |
| 7,007,103 | B2 * | 2/2006 | Pinkerton et al. ........... 709/238 |
| 7,162,630 | B2 * | 1/2007 | Sperry et al. ................. 713/153 |
| 2002/0034182 | A1 | 3/2002 | Mallory |
| 2002/0095512 | A1 | 7/2002 | Rana et al. |
| 2003/0046330 | A1 | 3/2003 | Hayes |
| 2003/0128704 | A1 * | 7/2003 | Mizrachi et al. ............ 370/394 |
| 2004/0062246 | A1 | 4/2004 | Boucher et al. |
| 2005/0204058 | A1 | 9/2005 | Philbrick et al. |
| 2005/0232298 | A1 | 10/2005 | Beverly et al. |

* cited by examiner

*Primary Examiner*—Chau Nguyen
*Assistant Examiner*—Hicham B Foud
(74) *Attorney, Agent, or Firm*—McAndrews, Held & Malloy, Ltd.

(57) ABSTRACT

Certain aspects of the invention provide handling out-of-order TCP segments and may include placing a first received segment in a host buffer and determining whether a second received segment is an in-order or out-of-order (OOO) segment. Control information associated with OOO segments may be stored locally on a network interface card (NIC) and the OOO segment placed in a host buffer rather than on the NIC. An address or location occupied by an end of the first received segment may be recorded and stored on the NIC. As in-order and/or OOO segments are received, control information associated with a starting address and/or end address may be stored on the NIC. Accordingly, as subsequent in-order and/or OOO segments are received, they may be correctly placed within the host buffer based on the recorded and/or stored control information without being buffered on the NIC.

57 Claims, 17 Drawing Sheets

METHOD AND SYSTEM FOR DATA PLACEMENT OF OUT-OF-ORDER (OOO) TCP SEGMENTS

CROSS-REFERENCE TO RELATED APPLICATIONS/INCORPORATION BY REFERENCE

This application makes reference to, claims priority to, and claims the benefit of:

U.S. Provisional Application Ser. No. 60/456,260 filed Mar. 20, 2003;

U.S. Provisional Patent Application Ser. No. 60/407,165, filed on Aug. 30, 2002; and U.S. Provisional application Ser. No. 60/484,180 filed Jul. 1, 2003.

The above stated applications are incorporated herein by reference in their entirety.

FIELD OF THE INVENTION

Certain embodiments of the invention relate to the processing of reception of packets. More specifically, certain embodiments of the invention relate to a method and system for data placement of out-of-order (OOO) TCP segments.

BACKGROUND OF THE INVENTION

Conventional transmission control protocol/Internet protocol (TCP/IP) offload engines residing on network interface cards (NICs) or elsewhere in a system such as in system software stacks, may inefficiently handle out-of-order (OOO) transmission control protocol (TCP) segments. For example, some conventional offload engines may merely drop out-of-order TCP segments. Dropped TCP segments need to be retransmitted by the sender, thereby utilizing additional bandwidth and reducing effective throughput. On links with large bandwidth-delay products such as a high-speed local area network (LAN) of the order of 1 Gbps or faster, a large number of segments may be in transit between the sender and the receiver when the out-of-order TCP segment is dropped. Accordingly, many of the segments in transit must be retransmitted, thereby creating a substantial delay and excessive consumption of additional, often expensive and scarce bandwidth. A similar situation may arise with long-haul wide area networks (WANs) that may have moderate bit rates and typical delays of the order of about 100 ms. In these types of networks, for example, system performance and throughput may be drastically reduced by the retransmissions.

In some conventional systems, on the sender or transmitter side, TCPs generally begin transmission by injecting multiple TCP segments into the network corresponding to a maximum window size that may be indicated by a receiver. In networks in which traffic traverses multiple networking entities or devices having varying link speeds, some of the networking entities or devices may have to queue TCP segments in order to handle the traffic. For example, slower network devices such as routers and links in the communication path between the transmitter side and the receiver side may have to queue TCP segments. In this regard, there may be instances when there is insufficient memory on the networking entities or devices for queuing the TCP segments resulting in dropped segments. Accordingly, the TCP segments will have to be retransmitted, thereby consuming additional bandwidth.

In certain systems, retransmission may trigger TCP slow start and congestion-avoidance procedures which may result in a substantial decrease in available bandwidth of a communication link. TCP slow start is an algorithm that may be utilized to minimize the effects of lost packets that may result from insufficient memory on slower networking entities or devices. TCP slow start utilizes a congestion window that is initialized to one TCP segment at the time of link initiation. The TCP segment size may be advertised by the receiver side. In operation, the TCP segment size is incremented by one (1) for every acknowledgement (ACK) that may be received from the receiving side by the transmitting side. The sending side may therefore transmit a minimum number of TCP segments as specified by the minimum of the congestion window and the window that may be advertised by the receiving side. This may provide a near exponential growth in the window side and at some point, maximum capacity may be reached and the networking entity or device may start dropping packets.

Congestion avoidance is an algorithm that may be utilized in conjunction with slow start to minimize the effects of lost packets. Congestion may occur when a device receives more TCP segments at its input than it may be able to adequately process with some minimal acceptable delay. Congestion may also occur when TCP segments transition from a faster transport infrastructure to a slower transport infrastructure. In this regard, the network device at the edge of the faster transport infrastructure and the slower transport infrastructure becomes a bottleneck. Congestion avoidance utilizes packet loss and duplicate acknowledgements (ACKs) to determine when congestion occurs. Although slow start and congestion avoidance have varying objectives and are independent of each other, TCP recovery from congestion may involve decreasing the transmission rate and executing slow start to gradually increase the transmission rate from a window size of one (1). In some cases, TCP generates numerous ACKs and congestion avoidance may interpret this to mean that TCP segments are lost, resulting in retransmission. Accordingly, TCP recovery from congestion avoidance and/or TCP slow start can be a relatively slow process and may in certain instances, also cause unwanted retransmissions.

Other conventional offload engines may store out-of-order TCP segments in dedicated buffers attached to the offload engines residing on the NIC or a host memory until all the missing TCP segments have been received. The offload engine may then reorder and process the TCP segments. However, storing the TCP segments in dedicated buffers can be quite hardware intensive. For example, the size of the dedicated buffers scale with the number of out-of-order TCP segments which may be based upon, for example, the bandwidth of the connections, the delay on the connections, the number of connections and the type of connections. In addition, storing the out-of-order segments on dedicated buffers may consume precious processor bandwidth when the out-of-order segments have to be reordered and processed. In addition, the offload engine still needs to handle other segments arriving at wire speed. Therefore, the reordering and processing may have to occur at the expense of delaying the processing of currently received TCP segments.

Accordingly, the computational power of the offload engine needs to be very high or at least the system needs a very large buffer to compensate for any additional delays due to the delayed processing of the out-of-order segments. When host memory is used for temporary storage of out-of-order segments, additional system memory bandwidth may be consumed when the previously out-of-order segments are copied to respective buffers. The additional copying provides a challenge for present memory subsystems, and as a result, these memory subsystems are unable to support high rates such as 10 Gbps. Thus, a reduction in activity on the memory would improve availability and would reduce latencies for at least some memory consumers.

In general, one challenge faced by TCP implementers wishing to design a flow-through NIC, is that TCP segments may arrive out-of-order with respect to the order placed in which they were transmitted. This may prevent or otherwise hinder the immediate processing of the TCP control data and prevent the placing of the data in a host buffer. Accordingly, an implementer may be faced with the option of dropping out-of-order TCP segments or storing the TCP segments locally on the NIC until all the missing segments have been received. Once all the TCP segments have been received, they may be reordered and processed accordingly. In instances where the TCP segments are dropped or otherwise discarded, the sending side may have to re-transmit all the dropped TCP segments and in some instances, may result in about a fifty percent (50%) decrease in throughput or bandwidth utilization.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Certain embodiments of the invention provide a method and system for handling or processing out-of-order TCP segments. Aspects of the method for handling out-of-order TCP segments may comprise at least one of: placing a first received TCP segment in a host buffer and having a mapping between a TCP sequence number and a corresponding buffer address; determining whether a second received TCP segment is one of an in-order TCP segment or an out-of-order TCP segment; if the second received TCP segment is an out-of-order TCP segment, then storing control information associated with at least the second TCP segment locally on a network interface card (NIC) and placing the out-of-order TCP segment in a portion of the host buffer. The processor may be a TCP offload engine (TOE), TCP-enabled Ethernet Controller (TEEC), a RISC processor and/or a finite state machine (FSM), at least a portion of which may be integrated within the NIC.

At least a buffer address occupied by an end of the first received TCP segment may be recorded on the NIC. In this regard, the buffer may be a TCP buffer, ULP buffer and/or an application buffer. If the second received TCP segment is an in-order TCP segment, the in-order TCP segment may be placed adjacent to the first received TCP segment in the host buffer. The processor may place the in-order TCP segment starting from an address adjacent to the recorded address occupied by the end of the first received TCP segment in the host buffer.

The NIC may also record data indicating: an end buffer address occupied by an end of the in-order TCP segment; a start buffer address plus a length of a data portion of the in-order TCP segment; and/or a buffer address of a byte following an end of the in-order TCP segment. Control information associated with at least one of the indicating data may also be stored on the NIC. Information recorded on the NIC may also comprise, data indicating: an address occupied by a start of the placed out-of-order TCP segment and an address occupied by an end of the placed out-of-order TCP segment; and/or a start buffer address plus a length occupied by the placed out-of-order TCP segment. Control information associated with the indicating data may also be stored on the NIC.

In a further aspect of the invention, a third out-of-order TCP segment may be received by the NIC. Placement in the host buffer may be determined by the NIC for the third received out-of-order TCP segment. If the third received out-of-order TCP segment is in-order with respect to the placed out-of-order TCP segment, the third out-of-order TCP segment may be placed adjacent to the placed out-of-order TCP segment in the host buffer and at least one of the following may occur: adjusting the start address occupied by the placed out-of-order TCP segment to become a start address of the combined third out-of-order TCP segment and the out-of-order TCP segment; and adjusting the end address occupied by the placed out-of-order TCP segment to become an end address of the combined the third out-of-order TCP segment and the out-of-order TCP segment. The method may further include placing the third out-of-order TCP segment at an address in the host buffer that is located before the placed out-of-order TCP segment or located after the placed out-of-order TCP segment if the third received out-of-order TCP segment is out-of-order with respect to the placed out-of-order TCP segment.

Another aspect of the invention may include recording on the NIC, at least one of location data representing: a start address and an end address of a location where the third received TCP segment is placed in the host buffer on the NIC; a start address plus a length of where the third received TCP segment is placed in the host buffer on the NIC; and a byte following an end of where the third received TCP segment is placed in the host buffer on the NIC. Control information associated with at least the location data of where the third received TCP segment is placed, may also be stored on the NIC. A TCP window may be adjusted to an end of the last in order received TCP segment upon placing of the first received TCP segment in the host buffer. The method may further include adjusting the left edge of the TCP window to a next byte immediately following an end of an out-of-order TCP segment placed adjacent to an end of a last in-order previously received TCP segment. A left edge of the TCP window may be adjusted to a next byte immediately following an end of a last of a plurality of out-of-order TCP segments placed adjacent to an end of a last in-order previously received TCP segment. The left edge of a TCP window beside the next byte immediately following an end of a last in-order TCP segment may be placed adjacent to the first received TCP segment. Control information associated with at least a location of the TCP window may be stored on the NIC. The stored control information associated with at least a location of the TCP window may be updated whenever the TCP window is adjusted.

Another aspect of the invention may further comprise computing a buffer address in a first buffer for a location of a first byte of data for a first TCP segment; computing a buffer address for the first data byte in a second TCP segment based on a buffer address that corresponds to a TCP segment number of the second TCP segment; and computing an offset from the TCP segment number that corresponds to the first TCP segment to a first byte of the second TCP segment. It may then be determined whether the computed offset is larger than a length of the first buffer. If the computed offset is larger than the length of the first buffer, a length of the first buffer may be subtracted from the computed offset resulting in a new offset. A length of a second buffer may be subtracted from the new offset. If the subtraction of the second buffer results in the new offset being less than a length of the second buffer, buffering data for the second TCP segment in the first buffer and the second buffer. If the new offset is greater than a length of the second buffer, subtracting a length of other buffers until the buffers are exhausted and/or a remaining offset is less than a length of a current buffer. If a remaining offset is less than a length of the current buffer, data for the second TCP segment may be buffered in the second buffer, the third buffer, and the other buffers. If the buffers are exhausted, the second TCP segment may be dropped.

Another embodiment of the invention may provide a machine-readable storage, having stored thereon, a computer program having at least one code section for providing data handling out-of-order TCP segments such as the placement of out-of-order (OOO) TCP segments. The at least one code section may be executable by a machine, thereby causing the machine to perform the steps as described above for handling of out-of-order (OOO) TCP segments.

Aspects of the system for handling or processing out-of-order TCP segments, may comprise at least one processor that at least one of: places a first received TCP segment in a host buffer and having a mapping between a TCP sequence number and a corresponding buffer address; determines whether a second received TCP segment is one of an in-order TCP segment or an out-of-order TCP segment; stores control information associated with at least the second TCP segment locally on a network interface card (NIC) and/or places the out-of-order TCP segment in a portion of the host buffer if the second received TCP segment is an out-of-order TCP segment.

The processor may record at least a buffer address occupied by an end of the first received TCP segment on the NIC. The buffer may be a TCP buffer, ULP buffer and/or an application buffer. If the second received TCP segment is an in-order TCP segment, the in-order TCP segment may be placed adjacent to the first received TCP segment in the host buffer by the processor. The processor may place the in-order TCP segment starting from an address adjacent to the recorded address occupied by the end of the first received TCP segment in the host buffer.

The NIC may also record at least one of data indicating: an end buffer address occupied by an end of the in-order TCP segment; a start buffer address plus a length of a data portion of the in-order TCP segment; and/or a buffer address of a byte following an end of the in-order TCP segment. Control information associated with at least one of the indicating data may also be stored on the NIC by the processor. The processor may also record on the NIC, data indicating: an address occupied by a start of the placed out-of-order TCP segment and an address occupied by an end of the placed out-of-order TCP segment; and/or a start buffer address plus a length occupied by the placed out-of-order TCP segment. Control information associated with the indicating data may also be stored on the NIC.

In a further aspect of the invention, a third out-of-order TCP segment may be received by the NIC. The processor may determine placement in the host buffer for the third received out-of-order TCP segment. If the third received out-of-order TCP segment is in-order with respect to the placed out-of-order TCP segment, the processor may place the third out-of-order TCP segment adjacent to the placed out-of-order TCP segment in the host buffer and at least one of the following may occur: the processor may adjust the start address occupied by the placed out-of-order TCP segment to become a start address of the combined third out-of-order TCP segment and the out-of-order TCP segment; and the processor may adjust the end address occupied by the placed out-of-order TCP segment to become an end address of the combined third out-of-order TCP segment and the out-of-order TCP segment. The processor may also place the third out-of-order TCP segment at an address in the host buffer located before the placed out-of-order TCP segment and/or located after the placed out-of-order TCP segment if the third received out-of-order TCP segment is out-of-order with respect to the placed out-of-order TCP segment.

In another aspect of the invention, the processor may record the following: at least one of location data representing: a start address and an end address of a location where the third received TCP segment is placed in the host buffer on the NIC; a start address plus a length of where the third received TCP segment is placed in the host buffer on the NIC; and/or a byte following an end of where the third received TCP segment is placed in the host buffer on the NIC. Control information associated with at least the location data of where the third received TCP segment is placed may also be stored on the NIC. A TCP window may be adjusted by the processor to an end of the last in order received TCP segment upon placing of the first received TCP segment in the host buffer. The processor may also adjust the left edge of the TCP window to a next byte immediately following an end of an out-of-order TCP segment placed adjacent to an end of a last in-order previously received TCP segment. A left edge of the TCP window may be adjusted by the processor to a next byte immediately following an end of a last of a plurality of out-of-order TCP segments placed adjacent to an end of a last in-order previously received TCP segment. The left edge of a TCP window next to the byte immediately following an end of a last in-order TCP segment may be placed by the processor adjacent to the first received TCP segment. Control information associated with at least a location of the TCP window may be stored on the NIC. The stored control information associated with at least a location of the TCP window may be updated by the processor whenever the TCP window is adjusted.

In another aspect of the invention, the processor may compute a buffer address in a first buffer for a location of a first byte of data for a first TCP segment; compute a buffer address for the first data byte in a second TCP segment based on a buffer address that corresponds to a TCP segment number of the second TCP segment; and/or compute an offset from the TCP segment number that corresponds to the first TCP segment to a first byte of the second TCP segment. The processor may then determine whether the computed offset is larger than a length of the first buffer. If the computed offset is larger than the length of the first buffer, the processor may subtract a length of the first buffer from the computed offset resulting in a new offset. A length of a second buffer may be subtracted from the new offset by the processor. If the subtraction of the second buffer results in the new offset being less than a length of the second buffer, the processor may cause data to be buffered for the second TCP segment in the first buffer and the second buffer. If the new offset is greater than a length of the second buffer, the processor may subtract a length of other buffers until the buffers are exhausted and/or a remaining offset is less than a length of a current buffer. If a remaining offset is less than a length of the current buffer, the processor may cause data for the second TCP segment to be buffered in the second buffer, the third buffer, and the other buffers. If the buffers are exhausted, the second TCP segment may be dropped by the processor.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention relate to the processing of packets received. More specifically, certain embodiments of the invention relate to a method and system for data placement of out-of-order (OOO) TCP segments.

Figure 1A:
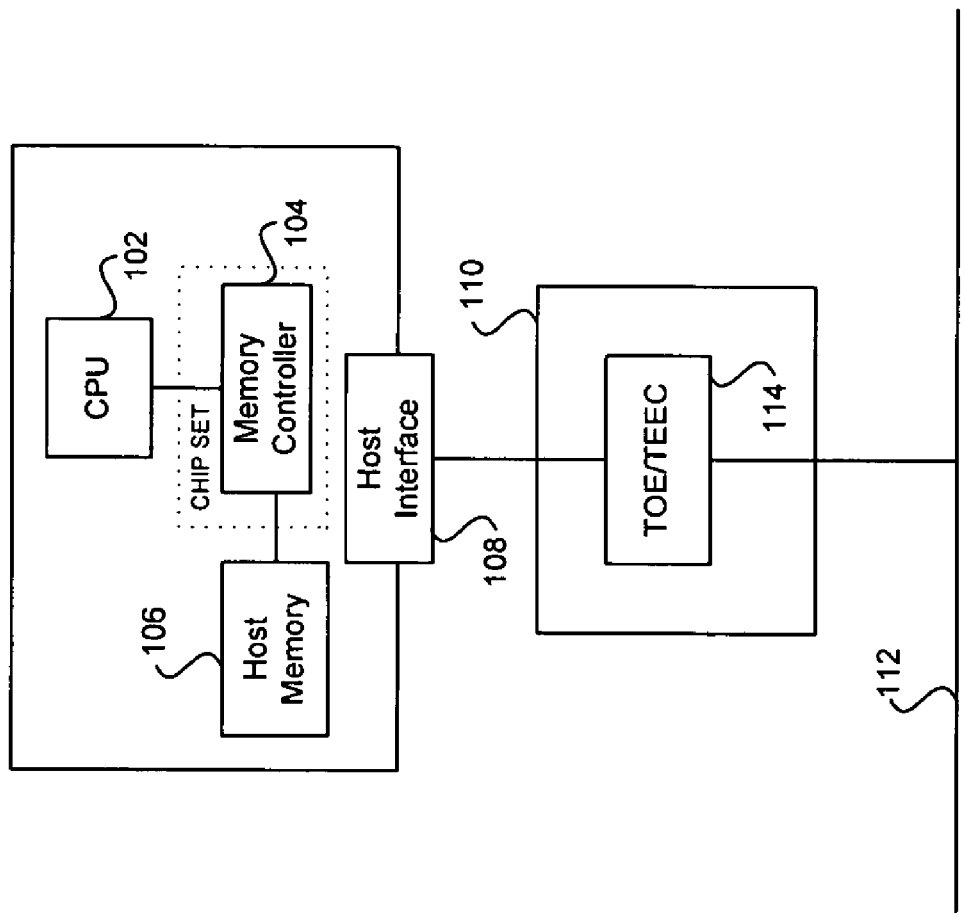
FIG. 1A is a block diagram of an exemplary system that may be utilized in connection with the invention for handling out-of-order frames in accordance with an embodiment of the invention.

FIG. 1A is a block diagram of an exemplary system that may be utilized in connection with the invention for handling out-of-order frames in accordance with an embodiment of the invention. Accordingly, the system of FIG. 1A may be adapted to handle out-of-order (OOO) transmission control protocol (TCP) datagrams in a flow-through manner according to aspects of the invention. Referring to FIG. 1A, the system may include, for example, a CPU 102, a memory controller 104, a host memory 106, a host interface 108, network subsystem 110 and an Ethernet 112. The network subsystem 110 may include, for example, a TCP-enabled Ethernet Controller (TEEC) or a TCP offload engine (TOE) 114. The network subsystem 110 may include, for example, a network interface card (NIC). The host interface 108 may be, for example, a peripheral component interconnect (PCI), PCI-X, ISA, SCSI or other type of bus. The memory controller 106 may be coupled to the CPU 104, to the memory 106 and to the host interface 108. The host interface 108 may be coupled to the network subsystem 110 via the TEEC or the TOE 114.

Figure 1B:
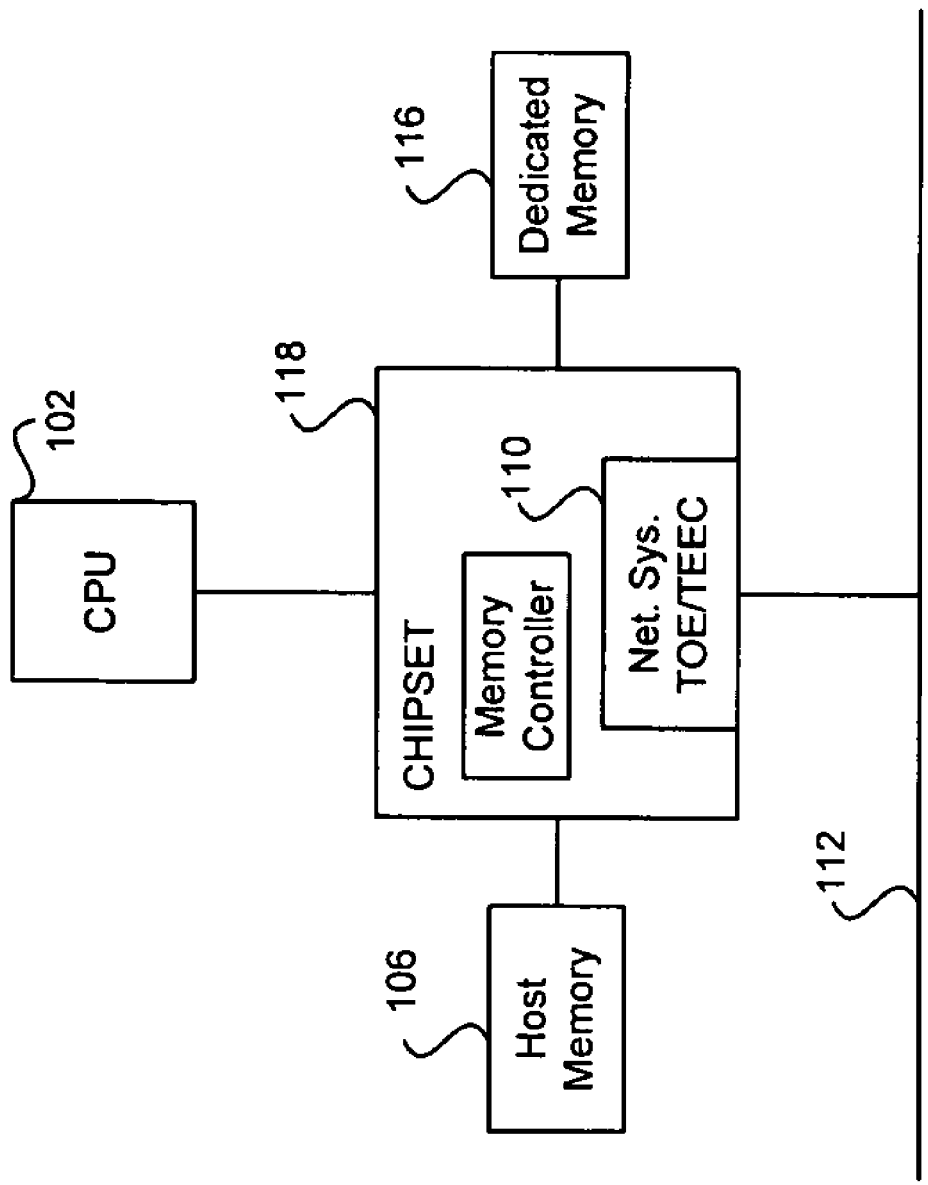
FIG. 1B is a block diagram of another exemplary system that may be utilized in connection with the invention for handling out-of-order frames in accordance with an embodiment of the invention.

FIG. 1B is a block diagram of another exemplary system that may be utilized in connection with the invention for handling out-of-order frames in accordance with an embodiment of the invention. FIG. 1B is a block diagram of another exemplary system that may be utilized in connection with the invention for handling out-of-order frames in accordance with an embodiment of the invention. Accordingly, the system of FIG. 1B may be adapted to handle out-of-order (OOO) transmission control protocol (TCP) datagrams in a flow-through manner according to aspects of the invention. Referring to FIG. 1B, the system may include, for example, a CPU 102, a host memory 106, a dedicated memory 116 and a chip set 118. The chip set 118 may include, for example, the network subsystem 110. The chip set 118 may be coupled to the CPU 102, to the host memory 106, to the dedicated memory 116 and to the Ethernet 112. The network subsystem 110 of the chip set 118 may be coupled to the Ethernet 112. The network subsystem 110 may include, for example, the TEEC or the TOE which may be coupled to the Ethernet 112. The dedicated memory 116 may provide buffers for context and/or data.

Although illustrated, for example, as a CPU and an Ethernet, the present invention need not be so limited to such examples and may employ, for example, any type of processor and any type of data link layer or physical media, respectively. Accordingly, although illustrated as coupled to the Ethernet 112, the TEEC or the TOE 114 of FIG. 1A may be adapted for any type of data link layer or physical media.

Furthermore, the present invention also contemplates different degrees of integration and separation between the components illustrated in FIGS. 1A-B. For example, the TEEC or the TOE 114 may be a separate integrated chip from the chip set 118 embedded on a motherboard or may be embedded in a NIC. In addition, the dedicated memory 116 may be integrated with the chip set 118 or may be integrated with the network subsystem 110 of FIG. 1B.

Some embodiments of the TEEC 114 are described in, for example, U.S. patent application Ser. No. 10/652,267 filed on Aug. 29, 2003. The above-referenced U.S. patent application is hereby incorporated herein by reference in its entirety.

Some embodiments of the TOE 114 are described in, for example, U.S. Provisional Patent Application Ser. No. 60/408,207, entitled "System and Method for Fault Tolerant TCP Offload" and filed on Sep. 4, 2002; U.S. patent application Ser. No. 10/337,029, entitled "System and Method for Fault Tolerant TCP Offload" and filed on Jan. 6, 2003; U.S. Provisional Patent Application Ser. No. 60/411,294, entitled "System and Method for Handling Partially Processed Frames" and filed on Sep. 17, 2002; U.S. patent application Ser. No. 10/302,474, entitled "System and Method for Handling Frames in Multiple Stack Environment" and filed on Nov. 21, 2002; U.S. Provisional Patent Application Ser. No. 60/410,022, entitled "System and Method for TCP Offloading and Uploading" and filed on Sep. 11, 2002; U.S. patent application Ser. No. 10/298,817, entitled "System and Method for TCP Offloading and Uploading" and filed on Nov. 18, 2002; U.S. Provisional Patent Application Ser. No. 60/408,617, entitled "System and Method for TCP/IP Offload" and filed on Sep. 6, 2002; and U.S. patent application Ser. No. 10/652,183, filed on Aug. 29, 2003. The above-referenced U.S. patent applications are all hereby incorporated herein by reference in their entirety.

Figure 1C:
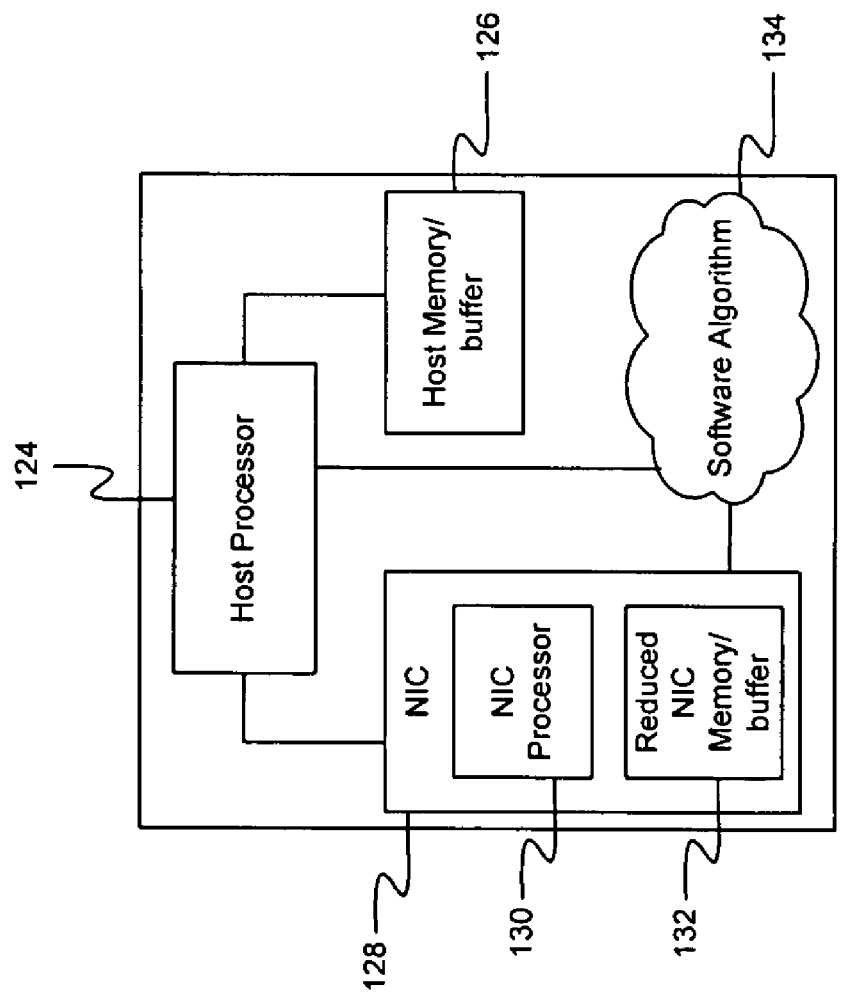
FIG. 1C is an alternative embodiment of an exemplary system that may be utilized for data placement of out-of-order (OOO) TCP segments in accordance with an embodiment of the invention.

FIG. 1C is an alternative embodiment of an exemplary system that may be utilized for data placement of out-of-order (OOO) TCP segments in accordance with an embodiment of the invention. Referring to FIG. 1C, there is shown a host processor 124, a host memory/buffer 126, a software algorithm block 134 and a NIC block 128. The NIC block 128 may include a NIC processor 130 and a reduced NIC memory/buffer block 132.

Figure 1D:
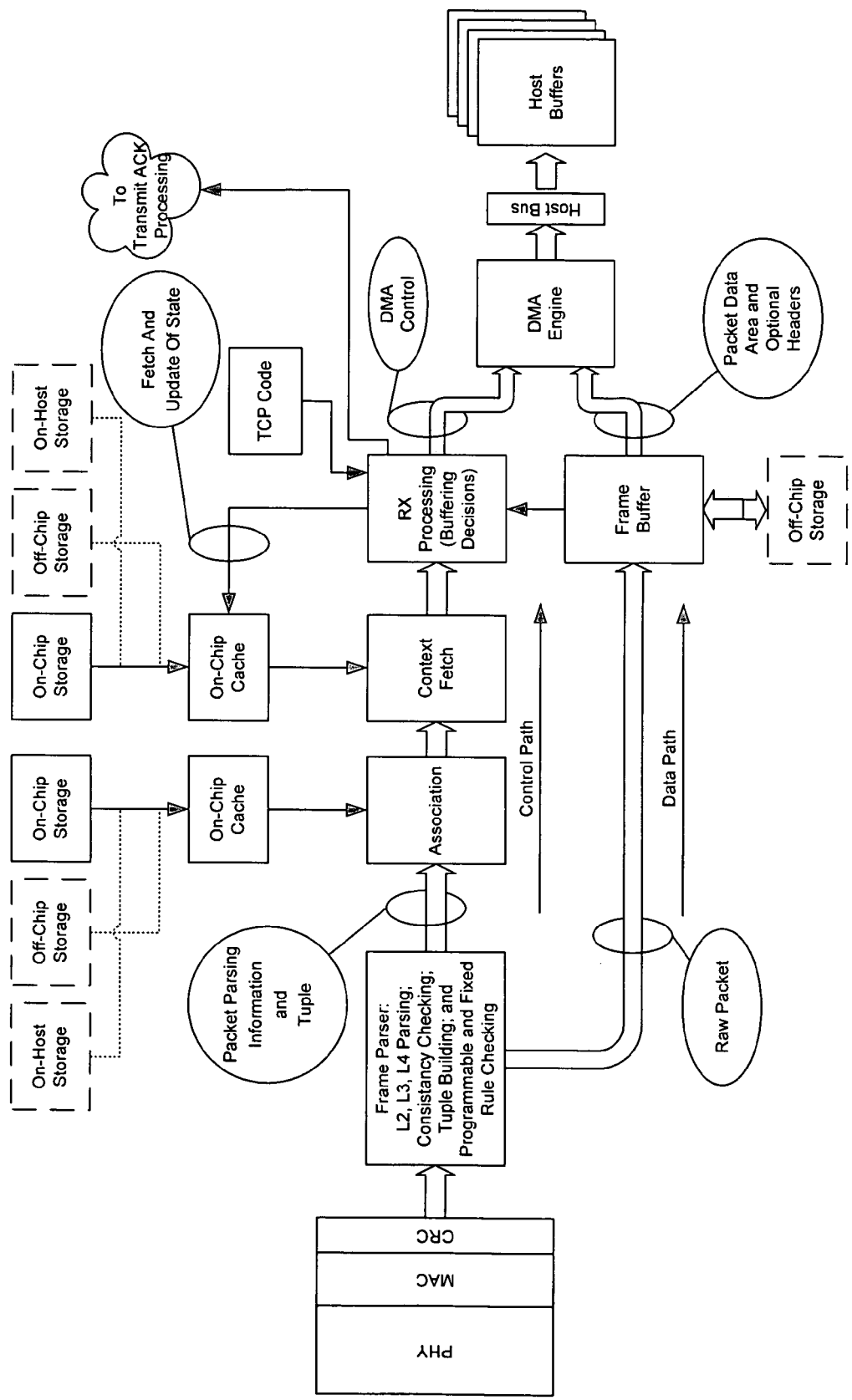
FIG. 1D is a block diagram of a system for handling out-of-order (OOO) transmission control protocol (TCP) datagrams in a flow-through manner in accordance with an embodiment of the invention.

FIG. 1D is a block diagram of a system for handling out-of-order (OOO) transmission control protocol (TCP) datagrams in a flow-through manner accordance with an embodiment of the invention. Referring to FIG. 1D, the incoming frame may be subject to L2 such as Ethernet processing including, for example, address filtering, frame validity and error detection. Unlike an ordinary Ethernet controller, the next stage of processing may include, for example, L3 such as IP processing and L4 such as TCP processing. The TEEC may reduce the host CPU utilization and memory bandwidth, for example, by processing traffic on hardware offloaded TCP/IP connections. The TEEC may detect, for example, the protocol to which incoming packets belong. If the protocol is TCP, then the TEEC may detect if the packet corresponds to an offloaded TCP connection, for example, a connection for which at least some TCP state information may be kept by the TEEC. Once a connection has been associated with a packet or frame, any higher level of processing such as L5 or above may be achieved. If the packet corresponds to an offloaded connection, then the TEEC may direct data movement of the data payload portion of the frame. The destination of the payload data may be determined from the connection state information in combination with direction information within the frame. The destination may be a host memory, for example. Finally, the TEEC may update its internal TCP and higher levels of connection state and may obtain the host buffer address and length from its internal connection state.

The receive system architecture may include, for example, a control path processing and data movement engine. The system components above the control path as illustrated in upper portion of FIG. 1D, may be designed to deal with the various processing stages used to complete, for example, the L3/L4 or higher processing with maximal flexibility and efficiency and targeting wire speed. The result of the stages of processing may include, for example, one or more packet identification cards (PID_Cs) that may provide a control structure that may carry information associated with the frame payload data. This may have been generated inside the TEEC while processing the packet in the various blocks. A data movement system as illustrated in the lower portion of FIG. 1D, may move the payload data portions of a frame along from, for example, an on-chip packet buffer and upon control processing completion, to a direct memory access (DMA) engine and subsequently to the host buffer that was chosen via processing.

The receiving system may perform, for example, one or more of the following: parsing the TCP/IP headers; associating the frame with an end-to-end TCP/IP connection; fetching the TCP connection context; processing the TCP/IP headers; determining header/data boundaries; mapping the data to a host buffer(s); and transferring the data via a DMA engine into these buffer(s). The headers may be consumed on chip or transferred to the host via the DMA engine.

The packet buffer may be an optional block in the receive system architecture. It may be utilized for the same purpose as, for example, a first-in-first-out (FIFO) data structure is used in a conventional L2 NIC or for storing higher layer traffic for additional processing.

The packet buffer in the receive system may not be limited to a single instance. As control path processing is performed, the data path may store the data between data processing stages one or more times depending, for example, on protocol requirements.

Figure 1E:
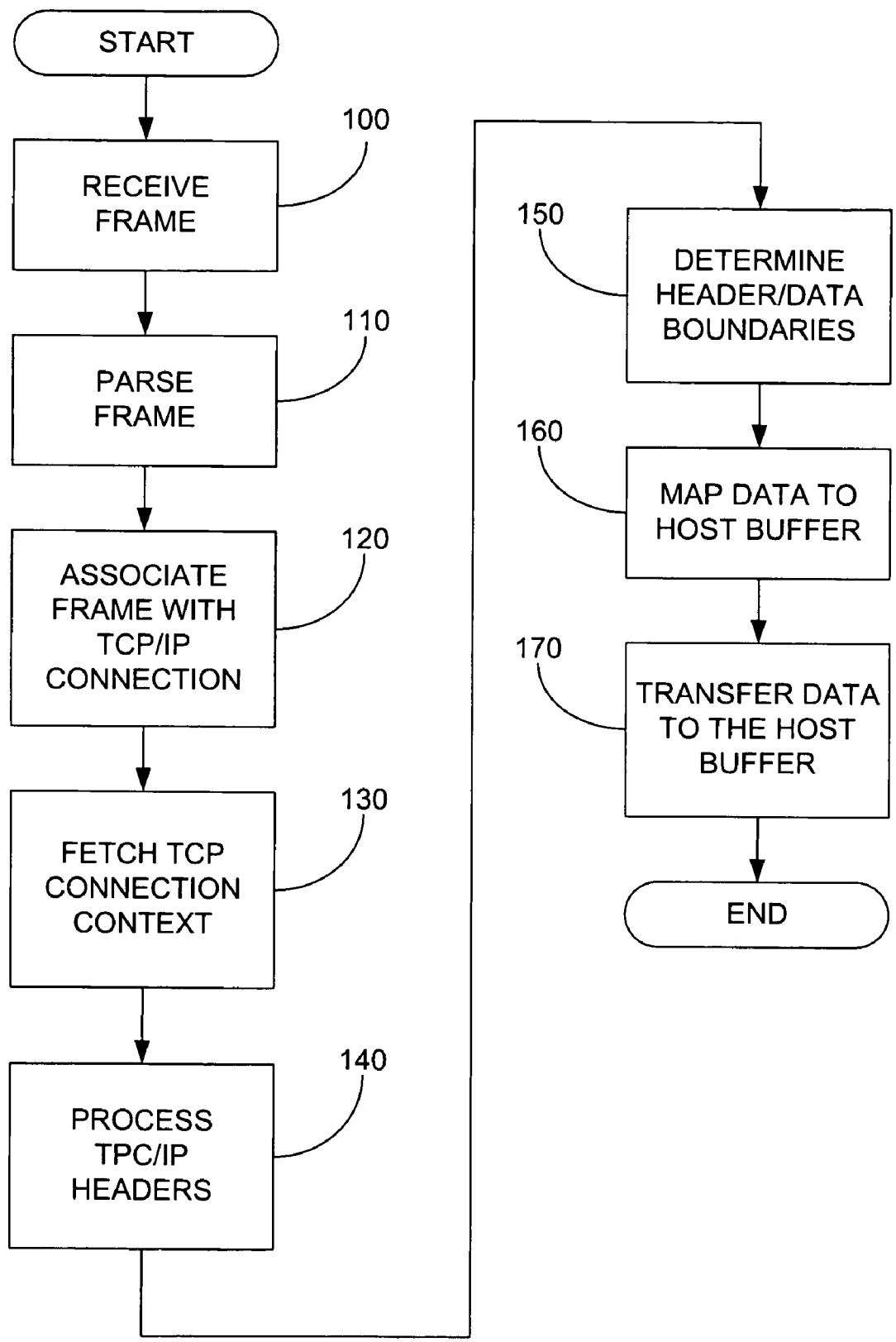
FIG. 1E is a flowchart illustrating exemplary steps for frame reception in accordance with an embodiment of the invention.

FIG. 1E is a flowchart illustrating exemplary steps for frame reception in accordance with an embodiment of the invention. Referring to FIG. 1D and FIG. 1E, in step 100, the NIC 110 may receive a frame from, for example, the Ethernet 112. In step 110, the frame parser may parse the frame, for example, to find the L3 and L4 headers. The frame parser may process the L2 headers leading up to the L3 header, for example IP version 4 (IPv4) header or IP version 6 (IPv6) header. The IP header version field may determine whether the frame carries an IPv4 datagram or an IPv6 datagram.

For example, if the IP header version field carries a value of 4, then the frame may carry an IPv4 datagram. If, for example, the IP header version field carries a value of 6, then the frame may carry an IPv6 datagram. The IP header fields may be extracted, thereby obtaining, for example, the IP source (IP SRC) address, the IP destination (IP DST) address, and the IPv4 header "Protocol" field or the IPv6 "Next Header". If the IPv4 "Protocol" header field or the IPv6 "Next Header" header field carries a value of 6, then the following header may be a TCP header. The results of the parsing may be added to the PID_C and the PID_C may travel with the packet inside the TEEC.

The rest of the IP processing may subsequently occur in a manner similar to the processing in a conventional off-the-shelf software stack. Implementation may vary from the use of firmware on an embedded processor to a dedicated, finite state machine, which may be potentially faster, or a hybrid of a processor and a state machine. The implementation may vary with, for example, multiple stages of processing by one or more processors, state machines, or hybrids. The IP processing may include, but is not limited to, extracting information relating to, for example, length, validity and fragmentation. The located TCP header may also be parsed and processed. The parsing of the TCP header may extract information relating to, for example, the source port and the destination port.

The TCP processing may be divided into a plurality of additional processing stages. In step 120, the frame may be associated with an end-to-end TCP/IP connection. After L2 processing, in one embodiment, the present invention may provides that the TCP checksum be verified. The end-to-end connection may be uniquely defined by, for example, the following 5 tuple: IP Source address (IP SRC addr); IP destination address (IP DST addr); L4 protocol above the IP protocol such as TCP, UDP or other upper layer protocol; TCP source port number (TCP SRC); and TCP destination port number (TCP DST). The process may be applicable for IPv4 or IPv6 with the choice of the relevant IP address.

As a result of the frame parsing in step 110, the 5 tuple may be completely extracted and may be available inside the PID_C. Association hardware may compare the received 5 tuple with a list of 5 tuples stored in the TEEC. The TEEC may maintain a list of tuples representing, for example, previously handled off-loaded connections or off-loaded connections being managed by the TEEC. The memory resources used for storing the association information may be costly for on-chip and off-chip options. Therefore, it is possible that not all of the association information may be housed on chip. A cache may be used to store the most active connections on chip. If a match is found, then the TEEC may be managing the particular TCP/IP connection with the matching 5 tuple.

Figure 1F:
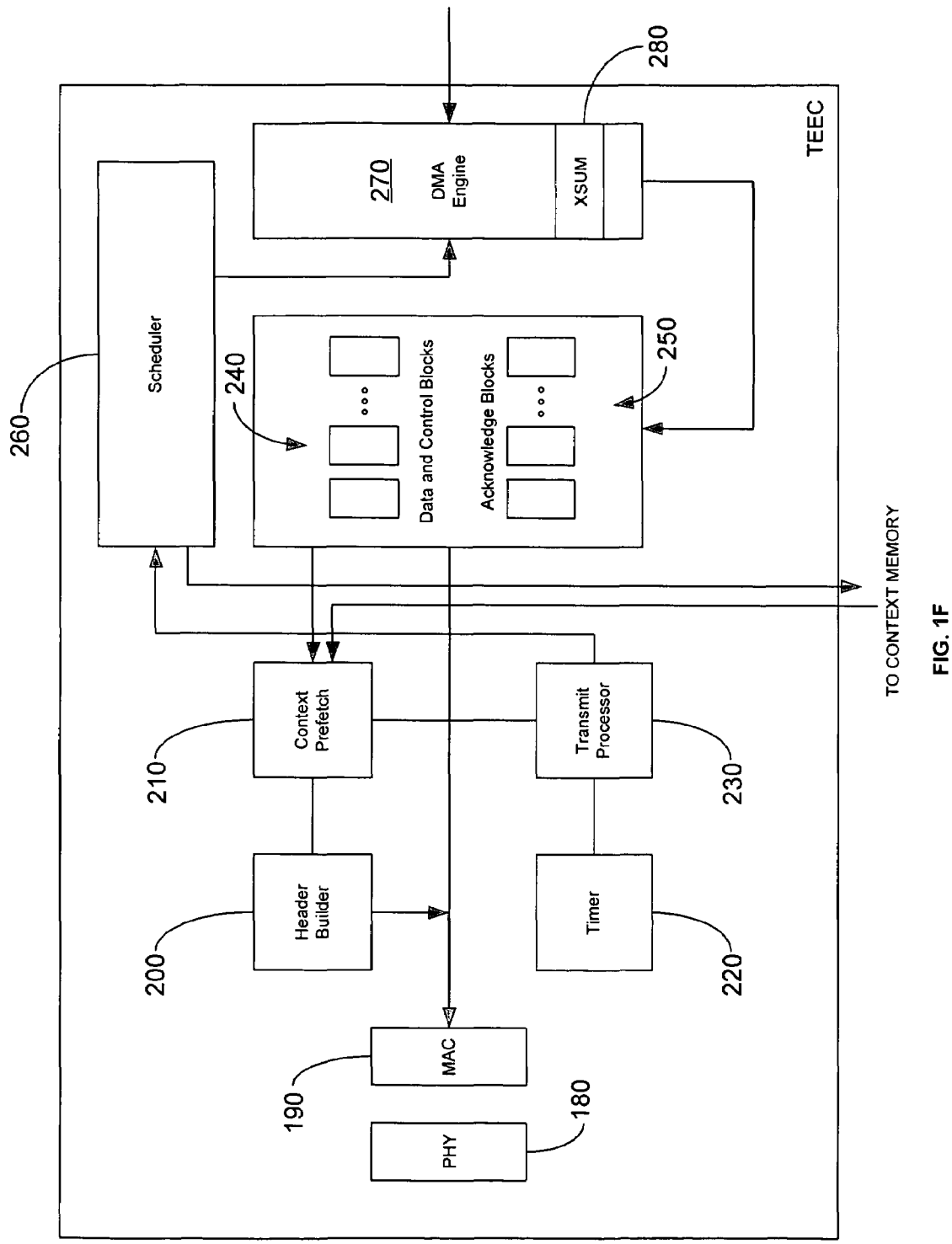
FIG. 1F illustrates an exemplary transmission path in accordance with an embodiment of the invention.

FIG. 1F illustrates an exemplary transmission path in accordance with an embodiment of the invention. Referring to FIG. 1F, the TEEC may include, for example, a physical layer (PHY) 180, a MAC layer 190, a header builder 200, a context prefetch 210, a timer 220, a transmit processor 230, data and control blocks 240, acknowledge blocks 250, a scheduler 260 and a DMA engine 270. The timer 220 may include, for example, TCP state code transmit and retransmit timers. The scheduler 260 may be adapted for, for example, windowing and/or retransmit arbitration. The DMA engine 270 may include, for example, an XSUM block 280 or other data specific processing. This may include inserting of data into the data provided by the host and computing CRC values. Notwithstanding, the data processing are not limited to these functions.

On the transmission path, the support for L4 and higher levels may include additional complexity and functionality. Transmission may include performing, for example, one or more of the following: scheduling transmission flow; transferring data via DMA; fetching context; transmit processing; adding L5 or higher and TCP/IP headers; arming the timers; and L2 transmitting.

The scheduler 260 may decide which flow to serve next. The scheduler 260 may also handle multiplexing L2 and L4 and higher levels of traffic. With respect to L4 and higher levels of traffic, the decision to schedule a particular TCP/IP flow for transmission may depend upon, for example, one or more of the following factors: data availability for transmission on the host side; remote end buffering state such as when a remote TCP connection has not closed the TCP window; preventing starvation among the potentially large number of TCP connections competing for time on the Ethernet media; availability of TCP acknowledges from the receive side; and a need to retransmit information on behalf of a TCP connection.

Utilizing some or all of the above-identified information or other information, the scheduler 260 may pick the next flow to be transmitted. The scheduler 260 may fetch the pointer to the next host resident buffer from the context information. The scheduler 260 may also program the DMA engine 270 to get the data and store the data, for example, in the on-chip FIFO buffer.

The DMA engine 270 may transfer the data from the host buffer or buffers into, for example, an on-chip, transmit-side FIFO buffer. IP Checksum (IPv4) and TCP Checksum may be computed on the data being transferred. The computations may be performed concurrently with data movement. Higher levels of data processing may be done at this stage.

Flow context may be fetched, for example, by the context prefetch 220 from a central context resource. Accessing the central context resource may increase the usefulness of a locking mechanism among all of its consumers to ensure data integrity and coherency. The locking mechanism may be very efficient in minimizing undesired performance impact. The context for the selected flow may be provided to the transmit processor 230 such as a CPU and/or finite state machine (FSM).

The transmit processor 230 may be adapted, for example, to execute TCP/IP and higher levels of code, to update the context and to generate the TCP/IP and higher level header variables to be placed in the headers. The updated context may be stored. The processing for this stage may be performed by one or more stages including one or more processors, state machines or hybrid processors.

The header builder 200 may use the header variables generated by transmit processor 230 and may generate the TCP/IP and higher level headers and may attach the TCP/IP and higher level headers in front of the data to be transmitted. Using the partial checksum results obtained from the DMA engine 270, the header builder 200 may finalize the checksum fields and may place them in the respective headers. Transmit processing is not limited to a specific number of stages and processing and may be executed at different stages of processing as may be optimal.

The timer 220 may be armed by the transmit processor 230 and may update its future timer event list. When the L4 and higher levels of processing are complete, the L2 processing and transmission may follow the conventional steps performed by a conventional Ethernet controller.

A retransmission event is similar to a normal transmission except, for example, the data to be retransmitted may be fetched from the host buffers as before or from any other temporary holding buffers. The address for this data may be computed. The computation of the host buffer address may be more complex. The same mapping function described in the receive path section may be utilized for the retransmission TCP sequence number range. Once the buffer address is determined, the rest of the transmit process may occur as described above.

Exemplary receive and transmit paths of a TEEC in accordance with an embodiment of the invention are described in U.S. patent application Ser. No. 10/652,267 filed Aug. 29, 2003 and is incorporated herein by reference in its entirety.

A missing TCP segment may be referred to as a hole. In accordance with an embodiment of the invention, by accounting for the missing TCP segments, data associated with at least a portion of the missing TCP segments may be stored in, for example, a host buffer. A summary of control information or data associated with the missing TCP segments or hole may also be stored or kept locally on a NIC. This may provide a flow-through architecture, which may require minimal resources on the NIC. In this regard, the NIC may not be required to support a buffer for storing or buffering the out-of-order TCP segments and can use a resource efficient scalable memory to manage out-of-order TCP segments. In an aspect of the invention, a temporary buffer such as a FIFO may be utilized for temporarily buffering TCP segments to provide elasticity. With this approach, the memory required may not scale with number of connection, number of holes per connection or the TCP connection bandwidth delay product as would be typical of conventional systems. Accordingly, additional space may be allocated to accommodate the control data that scales with the number of holes and not with the number of TCP segments or frames that are out-of-order.

In accordance with an aspect of the invention, analysis of an exemplary TCP control plane state along with the information and the services that it may provide to its consumer, reveals that with slightly more accounting, a flow-through NIC may support out-of-order TCP segments without utilizing an on-NIC data buffer for storing out-of-order TCP segments. A temporarily buffer such as a FIFO or other organization of on-chip memory may be utilized to provide elasticity. Accordingly, out-of-order TCP segments may be sufficiently processed upon arrival to allow placement of data whenever the data adheres to the TCP rules or is properly rejected. In this regard, data may be properly rejected as being, for example, illegal or stale data. Illegal or stale data may include data that may have fallen outside or not received within the corresponding TCP window.

Figure 2A:
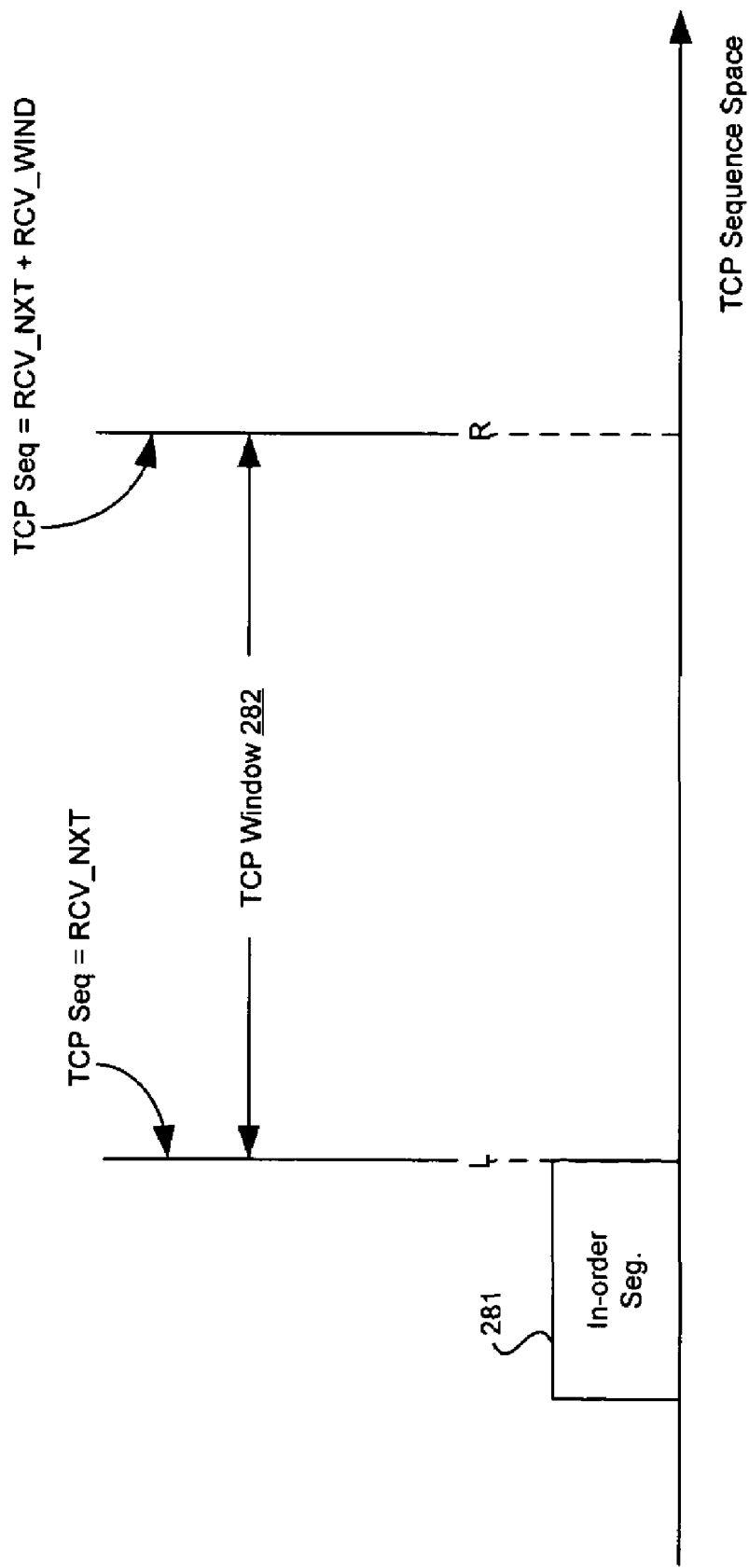
FIG. 2A is a block diagram of a received TCP segment within a TCP sequence space that may be utilized in connection with data placement of out-of-order TCP segments or frames in accordance with an embodiment of the invention.

FIG. 2A is a block diagram of a received TCP segment within a TCP sequence space that may be utilized in connection with data placement of out-of-order TCP segments or frames in accordance with an embodiment of the invention. Referring to FIG. 2A, there is shown a received TCP segment 281 within a TCP sequence space and a TCP window 282. Data that is to the right of the left boundary, denoted L, of the TCP receive window (RCV.NXT) and to the left of the right edge, denoted R, of the window (RCV.NXT+RCV_WIND), may be received according to the TCP protocol.

Figure 2B:
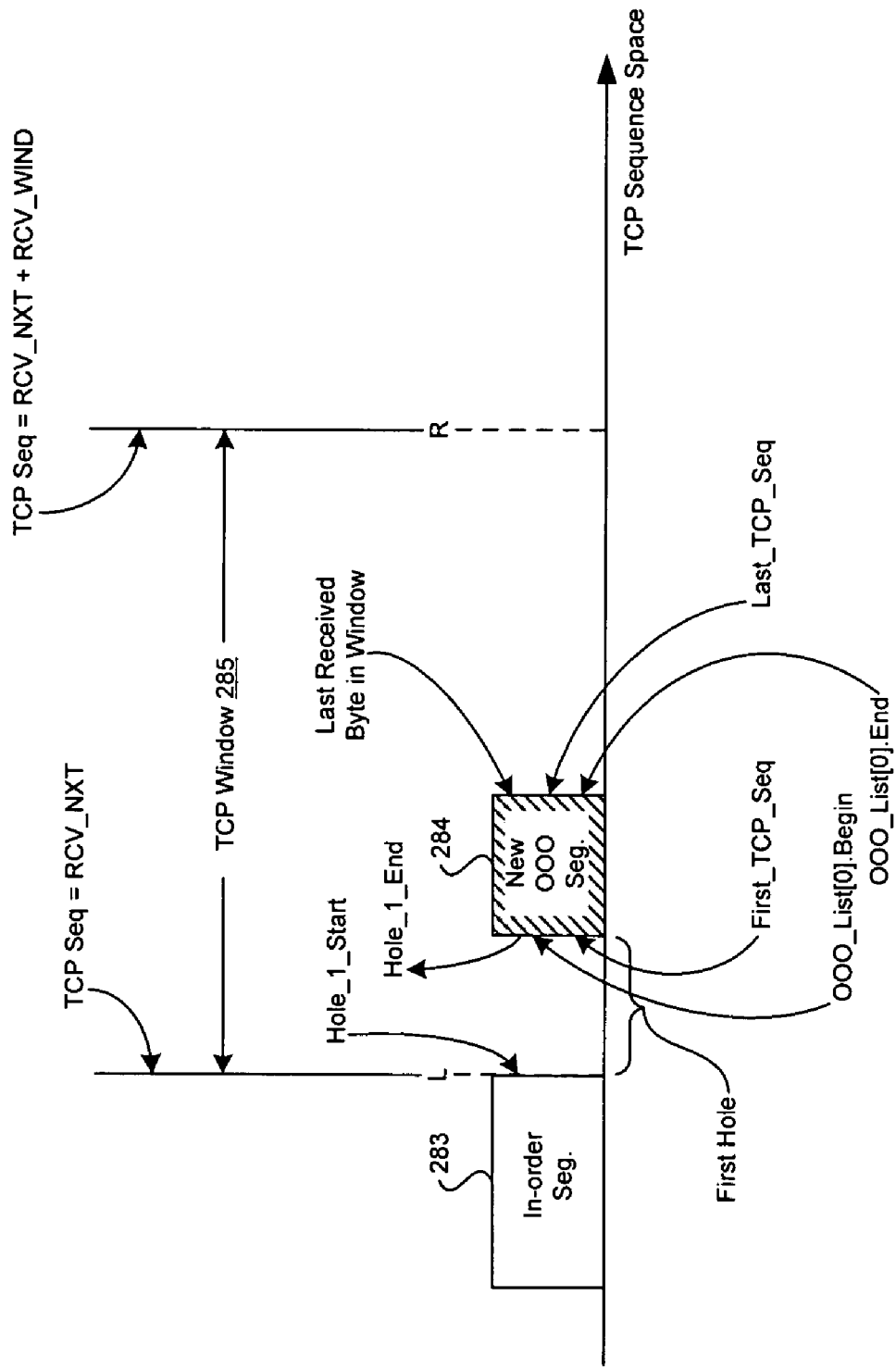
FIG. 2B is a block diagram of a newly received out-of-order TCP segment within a TCP sequence space that may be utilized in connection with data placement of out-of-order TCP segments or frames in accordance with an embodiment of the invention.

FIG. 2B is a block diagram of a newly received out-of-order TCP segment within a TCP sequence space that may be utilized in connection with data placement of out-of-order TCP segments or frames in accordance with an embodiment of the invention. Referring to FIG. 2B, there is shown an in-order TCP segment 283, an out-of-order TCP segment 284 within a TCP sequence space and a TCP window 285.

The newly received out-of-order TCP segment 284 creates a first hole lying between the in-order segment 283 and the newly received out-of-order TCP segment 284. The start of the first hole is denoted as Hole_1_Start and the end of the first hole is denoted as Hole_1_End. The location of the leftmost portion of the newly received out-of-order TCP segment 284 may be assigned a variable, for example, First_TCP_Seq and the rightmost portion of the newly received out-of-order TCP segment 284 may be assigned a variable, for example, Last_TCP_Seq. The location of the leftmost portion of the newly received out-of-order TCP segment 284 may also be assigned a variable, for example, OOO_List[0].Begin, and the rightmost portion of the newly received out-of-order TCP segment 284 may also be assigned to a variable, for example, OOO_List[0].End. In general, the variable OOO_List[0].Begin and the variable OOO_List[0].End provides a list that may be utilized to track the out-of-order TCP segments. Accordingly, in an aspect of the invention, the list that may be utilized to track the out-of-order TCP segments may be implemented in an array. Moreover, the invention is not so limited and other data structures may be utilized without departing from the various aspects of the invention.

In instances where TCP segments are out-of-order, common TCP stacks running on a host processor or dedicated network interface card may either drop the TCP segments or buffer the TCP segments until the hole in the TCP sequence space is plugged. After plugging, the TCP segment or segments that were received as out-of-order TCP segments may be processed.

Figure 3:
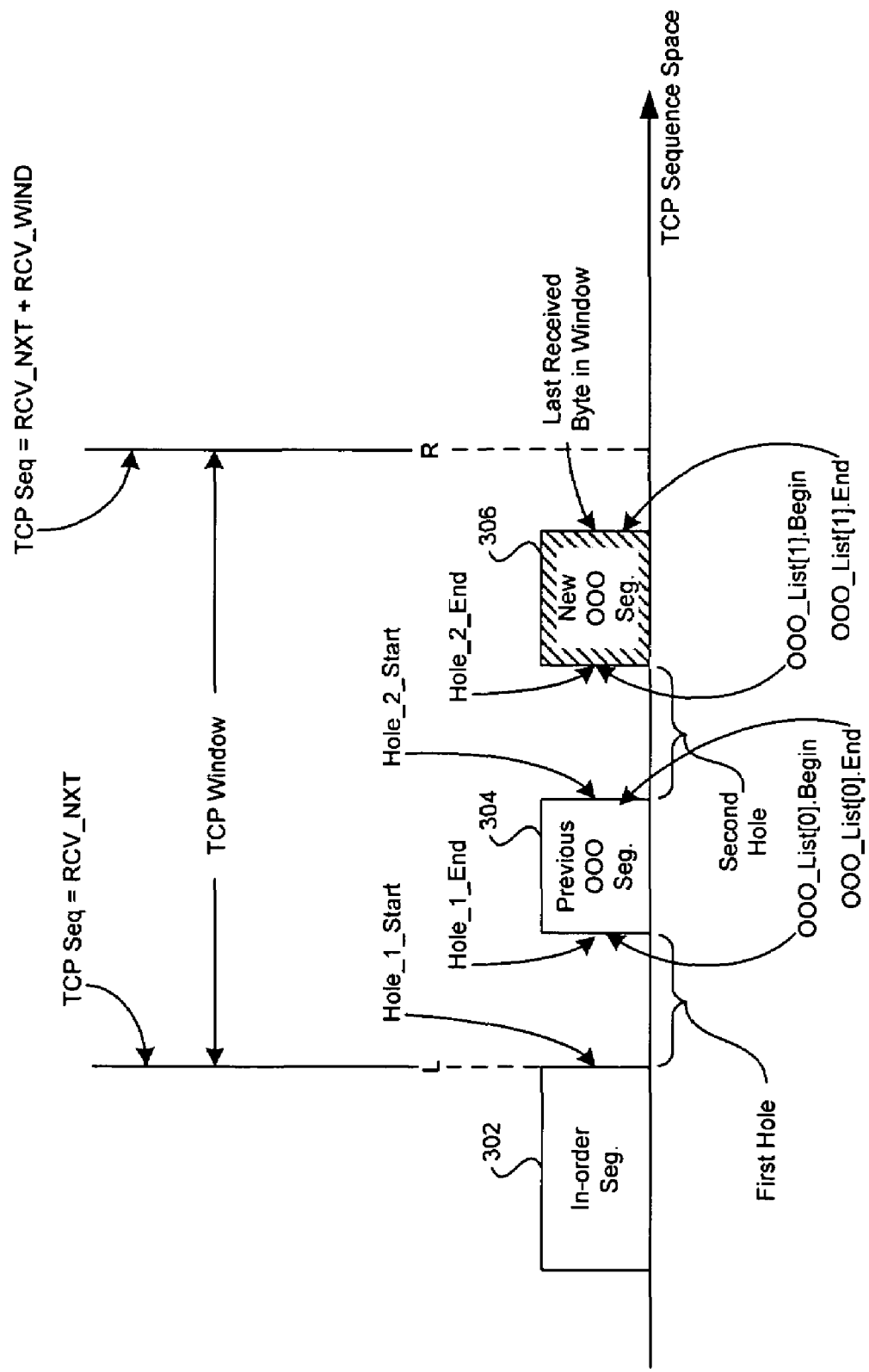
FIG. 3 is a block diagram of multiple received out-of-order TCP segments within a TCP sequence space that may be utilized in connection with data placement of out-of-order TCP segments or frames in accordance with an embodiment of the invention.

Notwithstanding, with a flow-through architecture, it may be desirable to have minimal or virtually no on-chip buffering for TCP processing of TCP segments. In this regard, TCP segments that may be valid may be processed and placed in host buffers as they are received from the network. The valid TCP segments are those segments that may fall inside a TCP window. In such a case, the receiver may acquire and/or monitor data associated with out-of-order TCP segments and keep an accounting of the TCP control space such that the hole can be plugged and duplicates prevented. For every hole in the TCP sequence space, the receiver may keep the TCP sequence number of its start and end points or start and length, for example. Another method is also illustrated in the pseudo code we use one way as an example). Any new TCP segment received thereafter may be checked to see if it is in-order, adjacent to a hole or is a new out-of-order TCP segment. The edges or boundaries of the holes may be moved accordingly. The reception process may follow the TCP protocol in which duplicate bytes are not received and data falling outside of the window is not received. For example, the variables First_TCP_seq and Last_TCP_Seq may be utilized to keep track of the first hole created by the placement of the new out-of-order segment 284 on the TCP sequence space of FIG. 2B FIG. 3 is a block diagram of multiple received out-of-order TCP segments within a TCP sequence space that may be utilized in connection with data placement of out-of-order TCP segments or frames in accordance with an embodiment of the invention. Referring to FIG. 3, there is shown an in-order TCP segment 302, a previous out-of-order TCP segment 304 and a new out-of-order TCP segment 306. The first hole is disposed between the in-order segment 302 and the previous out-of-order segment 304 as illustrated in FIG. 2B. Due to the placement of the new out-of-order TCP segment 306, the second hole is disposed between the previous out-of-order TCP segment 304 and the new out-of-order TCP segment 306. The start of the second hole may be denoted by, for example, the variable Hole_2_Start and the end of the second hole may be denoted by, for example, the variable Hole_1_End. The portion of the new out-of-order TCP segment 306 adjacent to the end of the second hole (Hole_2_End) may be assigned to a variable, for example, OOO_List[1].Begin. The end of segment 306 is assigned OOO_List[1].End.

Figure 4:
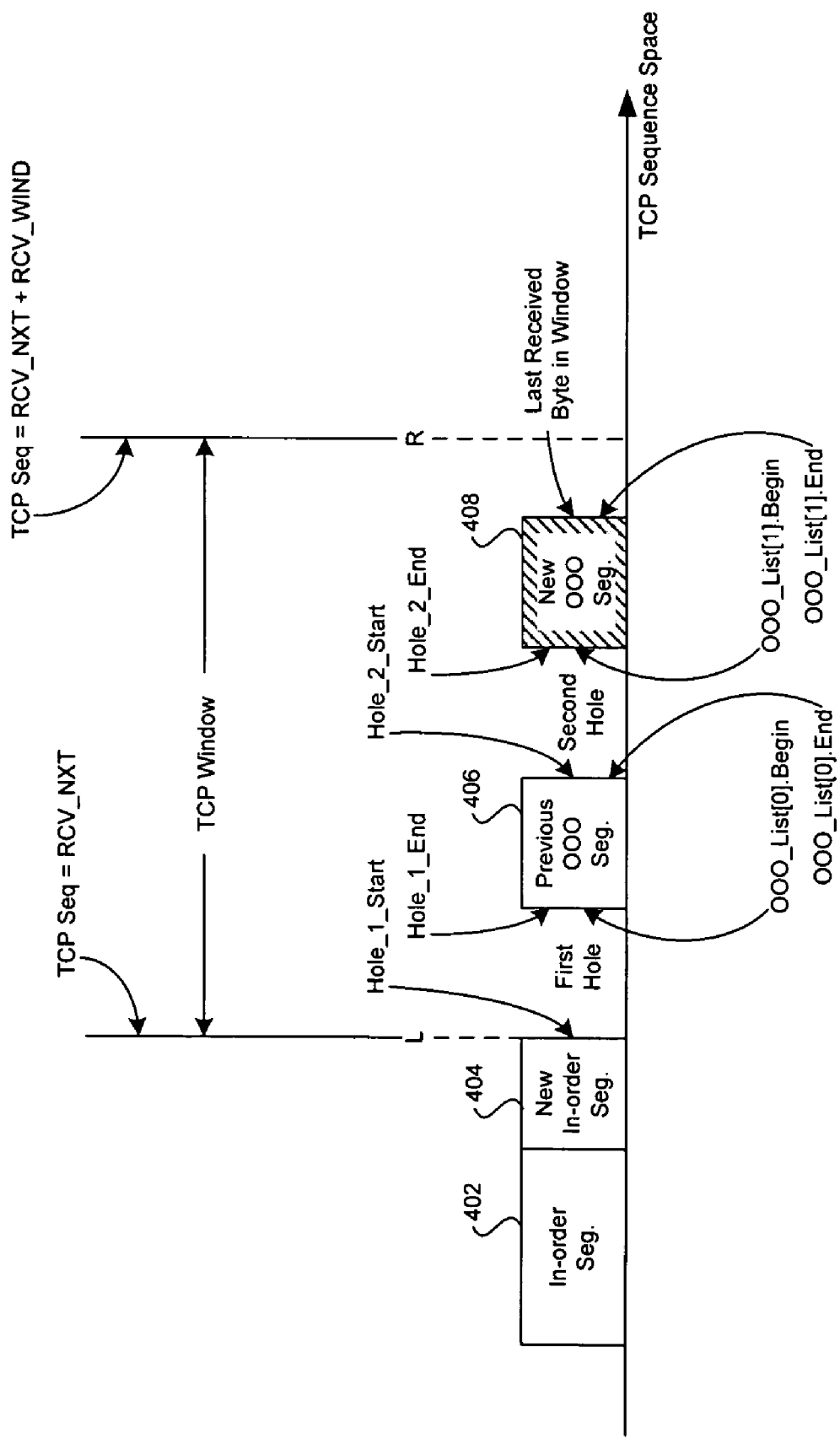
FIG. 4 is a block diagram of a newly received in-order TCP segment within a TCP sequence space that may be utilized in connection with data placement of out-of-order TCP segments or frames in accordance with an embodiment of the invention.

FIG. 4 is a block diagram of a newly received in-order TCP segment within a TCP sequence space that may be utilized in connection with data placement of out-of-order TCP segments or frames in accordance with an embodiment of the invention. Referring to FIG. 4, there is shown an in-order TCP segment 404, a new in-order TCP segment, a previous out-of-order segment 406 and a new out-of-order segment 408, all of which are located within a TCP sequence space. The newly received in-order TCP segment 404 is adjacent to the in-order segment 402. In accordance with an aspect of the invention, because the new in-order TCP segment is in-order with respect to the in-order segment 402, the variables associated with the first hole and/or the second hole may not have to be modified. However the left edge of the TCP Window may be updated. Additionally, it may also cause an update to the right edge of the TCP window.

Figure 5:
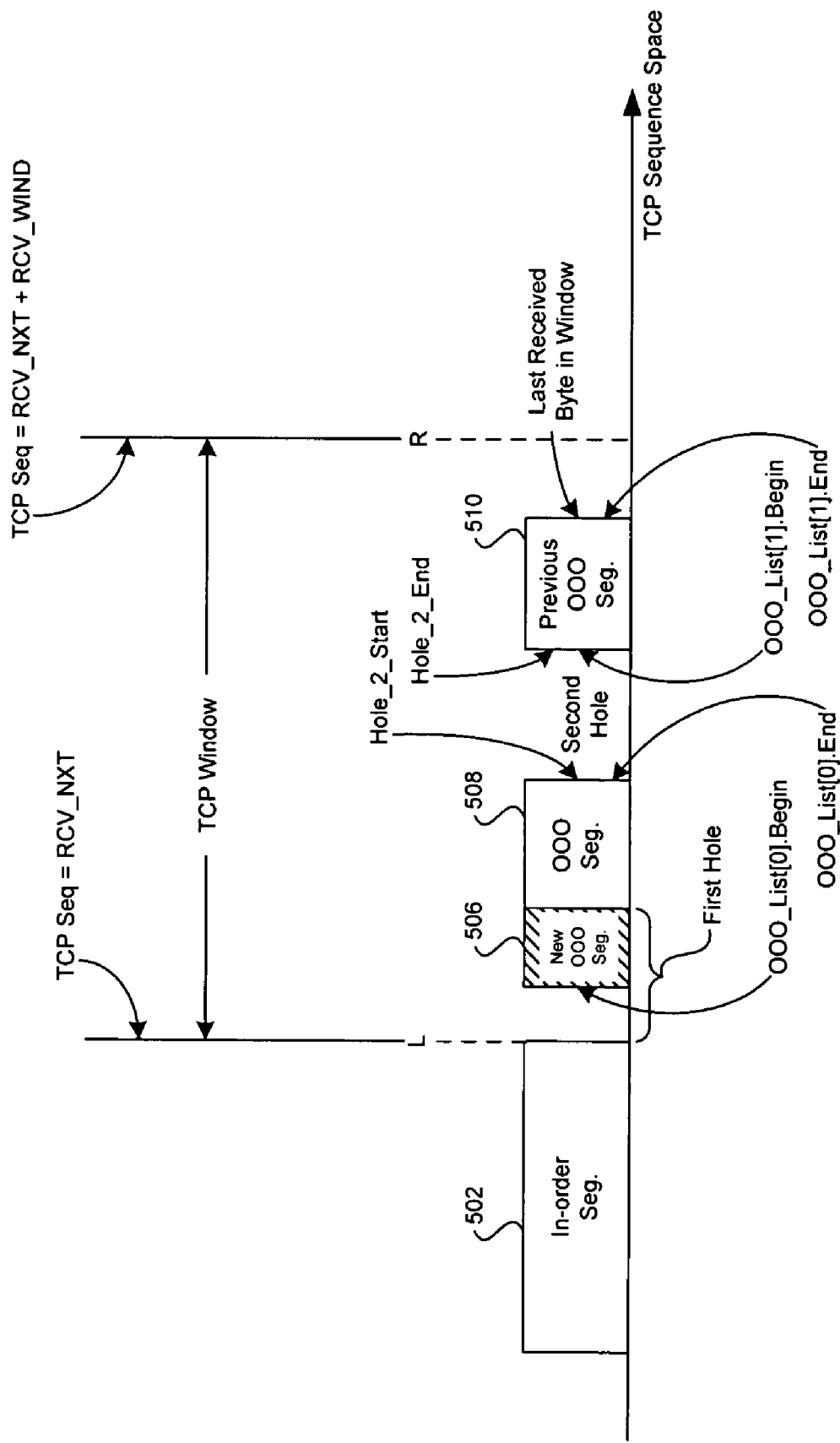
FIG. 5 is a block diagram of a newly received out-of-order TCP segment within a TCP sequence space that plugs a portion of a first hole and may be utilized in connection with data placement of out-of-order TCP segments or frames in accordance with an embodiment of the invention.

FIG. 5 is a block diagram of a newly received out-of-order TCP segment within a TCP sequence space that plugs a portion of a first hole and may be utilized in connection with data placement of out-of-order TCP segments or frames in accordance with an embodiment of the invention. Referring to FIG. 5, there is shown an in-order TCP segment 502, a new out-of-order segment 506, an out-of-order segment 508 and a previous out-of-order segment 510, all of which are located within a TCP sequence space.

The newly received out-of-order TCP segment 506 is adjacent to the out-of-order TCP segment 508 and plugs a portion of the first hole. Accordingly, in an aspect of the invention, since the new out-of-order TCP segment 506 plugs a portion of the first hole, the beginning of the OOO_List[0].Begin may be adjusted to reflect the placement of the new out-of-order TCP segment 506 adjacent to the out-of-order TCP segment 508. However, since the new out-of-order TCP segment 506 is adjacent to the out-of-order TCP segment 508, the variable OOO_List[1].End does not have to be modified. As new out-of-order frames are received, the first hole shrinks in size with no change in the amount of information that may be required for hole management.

Figure 6:
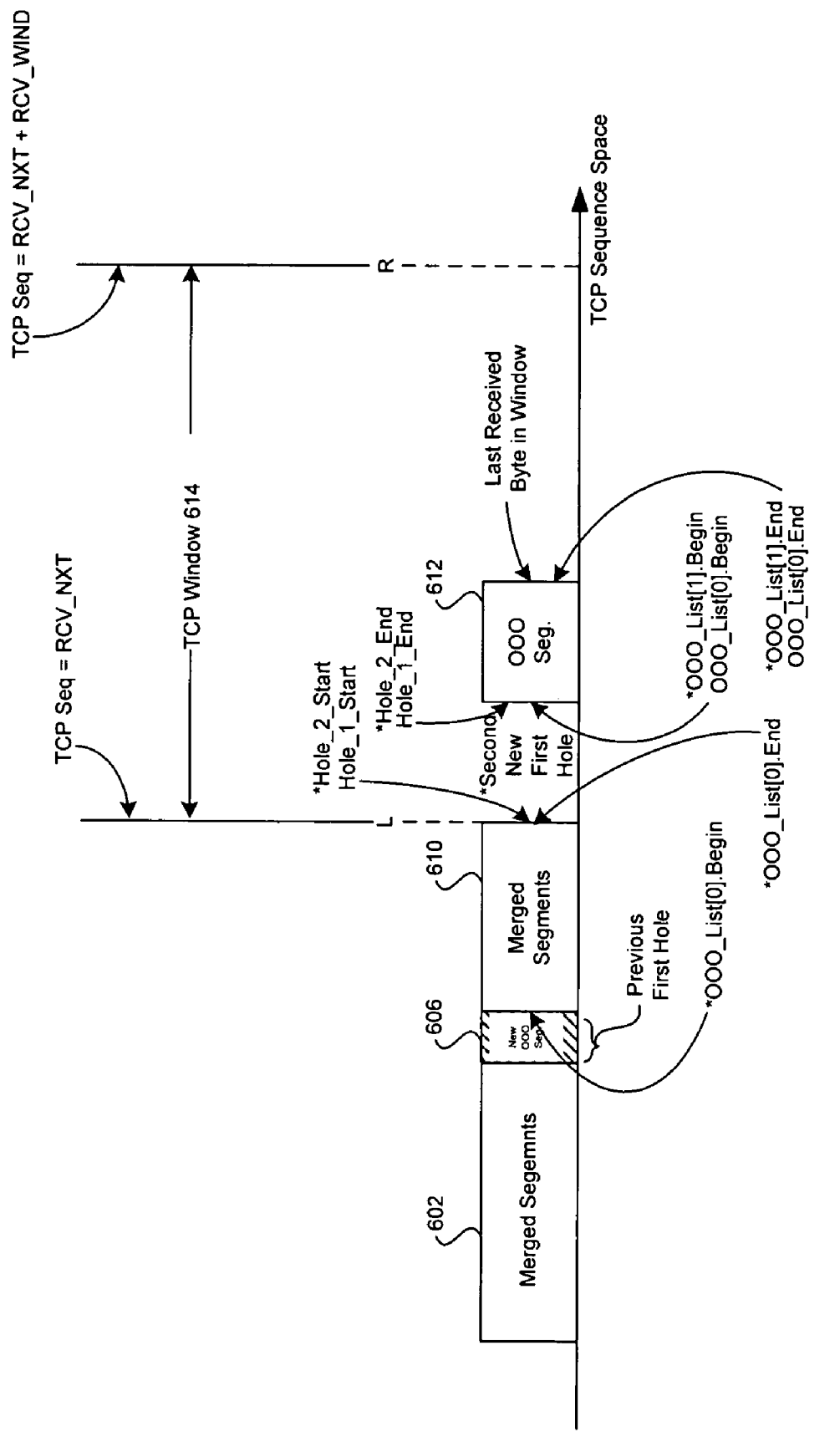
FIG. 6 is a block diagram of a newly received out-of-order TCP segment within a TCP sequence space that completely plugs a remaining portion of a first hole and may be utilized in connection with data placement of out-of-order TCP segments or frames in accordance with an embodiment of the invention.

FIG. 6 is a block diagram of a newly received out-of-order TCP segment within a TCP sequence space that completely plugs a remaining portion of a first hole and may be utilized in connection with data placement of out-of-order TCP segments or frames in accordance with an embodiment of the invention. Referring to FIG. 6, there is shown a merged TCP segment 602, a new out-of-order TCP segment 606, a merged TCP segment 610 and a out-of-order TCP segment 612, all of which are located within a TCP sequence space. The newly received out-of-order TCP segment 606 is between both the merged TCP segment 602 and the merged TCP segment 610. In this regard, the new out-of-order TCP segment 606 plugs the remaining portion of the first hole.

Subsequent to the plugging of the first hole, the second hole is designated at the new first hole and parameters associated with the second hole are designated as being associated with the new or current first hole. For example, OOO_LIST[1].Begin previously associated with the second hole is adjusted or designated as OOO_LIST[0].Begin The parameter OOO_LIST[1].End previously associated with the second hole is adjusted and designated as OOO_LIST[0].End. Finally, the start of the TCP window 614 shifts from the start of the previous first hole to the start of the new or current first hole. In this regard, TCP Seq=RCV_NXT shifts in such a manner that the TCP Seq=RCV_NXT starts at the beginning of the new or current first hole and extends to the right in the TCP sequence space. The TCP Seq=RCV_NXT+ REV_WIND may extend to the right by a value equivalent to the size TCP window 614, if additional buffers are available for the receiver and have been advertised to the remote peer by TCP protocol. In an aspect of the invention, as the new out-of-order frame completely plugs the first hole, less information required for hole management has to be stored. Accordingly, one of the hole descriptors can be removed and the left edge of the window moves to the right.

In general, new TCP segments or frames that are received and determined to be out-of-order may be utilized to shrink any of the holes in the TCP sequence number space they occupy that is adjacent to any existing hole. If the new frame plugs the space between two adjacent holes, then the holes are merged into one hole. Accordingly, with additional reference to FIG. 5, FIG. 6 indicates the merging of TCP segments when a hole is completely plugged by an out-of-order TCP segment. Additionally, FIG. 6 illustrates the shifting of the left edge of the TCP window 614 and optionally the right edge as well, when a hole is completely plugged. In this regard, with reference to FIG. 5 and FIG. 6, the leftmost edge of the TCP window 614 has shifted from the rightmost edge of the in-order TCP segment 502 (FIG. 5) to the rightmost edge of the previously out-of-order TCP segment 610 (FIG. 6), which is now the last in-order segment. The rightmost edge of the new in-order TCP segment 502 is synonymous to the merged TCP segment 602.

Figure 7A:
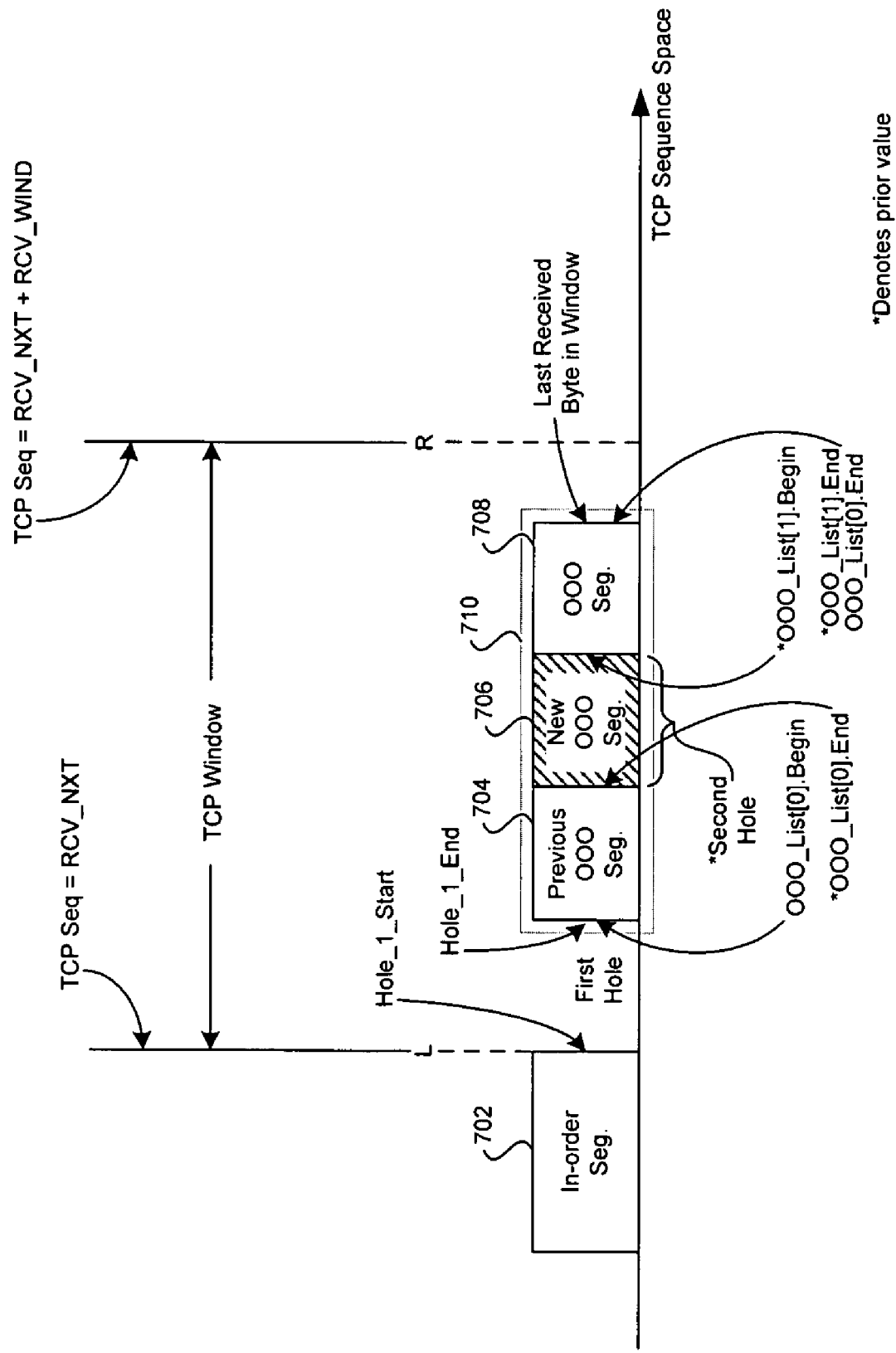
FIG. 7A is a block diagram of a newly received out-of-order TCP segment within a TCP sequence space that completely plugs a hole and may be utilized in connection with data placement of out-of-order TCP segments or frames in accordance with an embodiment of the invention.

FIG. 7A is a block diagram of a newly received out-of-order TCP segment within a TCP sequence space that completely plugs a hole and may be utilized in connection with data placement of out-of-order TCP segments or frames in accordance with an embodiment of the invention. Referring to FIG. 7A, there is shown a first hole, a second hole, an in-order TCP segment 702, a previous out-of-order TCP segment 704, a new out-of-order TCP segment 706 and a previous out-of order TCP segment 708. In addition to FIG. 7A, FIG. 3 may also be utilized as a reference for the illustrations of FIG. 7A. Accordingly, the first hole of FIG. 7A is disposed between the in-order segment 702 and the previous out-of-order segment 704. The second hole is disposed between the previous out-of-order segment 704 and the previous out-of-order segment 708. The new out-of-order TCP segment is adjacent to both the previous out-of-order segment 704 and the previous out-of-order segment 708. In this regard, the out-of-order segment 706 completely plugs the second hole. In an aspect of the invention, since the second hole is completely plugged, parameters associated with the second and/ or first hole may be updated to reflect the absence of the second hole. For example, OOO_LIST[1].Begin previously associated with the second hole is no longer required since the second hole no longer exist. The parameter OOO_LIST[0]. End previously associated with the end first hole holds an obsolete value since the right edge of the hole is contained in OOO_List[1].End, hence the value inside OOO_List[1].End is now copied to OOO_List[0].End. Finally, since there is no longer a second hole, the variable OOO_LIST[1].End may be removed. Accordingly, the three (3) consecutive TCP segments 704, 706 and 708 may have corresponding variables OOO_LIST[0].Begin and OOO_LIST[0].End, with OOO_LIST[0.Begin representing the leftmost portion of the previous out-of-order segment 704 and OOO_LIST[0].End representing the rightmost portion of out-of-order segment 708. From another perspective, the three (3) consecutive TCP segments 704, 706 and 708 may be regarded as a single out-of-order TCP segment 710 having corresponding variables OOO_LIST[0].Begin and OOO_LIST[0].End. Although new segments can partially or completely overlap one or more previously received segments, for simplicity this is not illustrated. However, such scenarios are covered in the pseudo code that follows.

In accordance with an embodiment of the invention, the flow-through NIC may manage as many holes inside the TCP receive window, as may be desirable. The optimal number of the holes the flow-through NIC may support may be dependent upon, for example, a typical drop syndrome associated a particular connection. For example, the connection may be a WAN connection where the drop may be due mainly to router congestion yielding potentially many holes in a large window. The connection may also be a LAN connection having, for example, a single drop due a switch and in this case, link-by-link flow control or congestion avoidance may take some time to start functioning.

As the type of drops such as the number of holes and number of segments or frames in a hole may vary, a programmable number of holes may be utilized. Each hole may require state variables that may be utilized to keep its start and end points. In case the flow-through NIC supports a upper layer protocol (ULP) on top of TCP, more state variables may be needed per hole. Upper layer protocol specific activities may be required once a hole is plugged and the receiver acquires more information regarding the behavior expected by the upper layer protocol in the TCP control plane. For example, the upper layer protocol may be notified of the completion of a message. However, in such a scenario, the basic separation between data and control plane may allow a flow-through NIC to accomplish placement with virtually no buffering of data or no buffering of out-of-order TCP segments.

In an embodiment of the invention, placement of data may be performed by mapping the TCP sequence space to the buffer space. In this regard, the buffer space may be viewed as a linear space. Accordingly, the first byte of the buffer may correspond to a particular TCP sequence value within the TCP sequence space. Accordingly, any other byte in the TCP segment may be placed at an offset in the buffer that may correspond to its delta or offset in the TCP sequence space as compared with the sequence value for the first byte. In other words, a starting address or location of a first byte of a TCP segment or TCP frame may operate as a reference point and any other byte may be located as an offset from the first byte in the TCP sequence space. In another aspect of the invention, there may be a upper layer protocol specific translation that may be utilized to map certain ranges of the TCP sequence numbers to specific buffer areas in a buffer space. Notwithstanding, this may not alter the basic mapping presented in accordance with the various aspects of the invention.

Figure 7B:
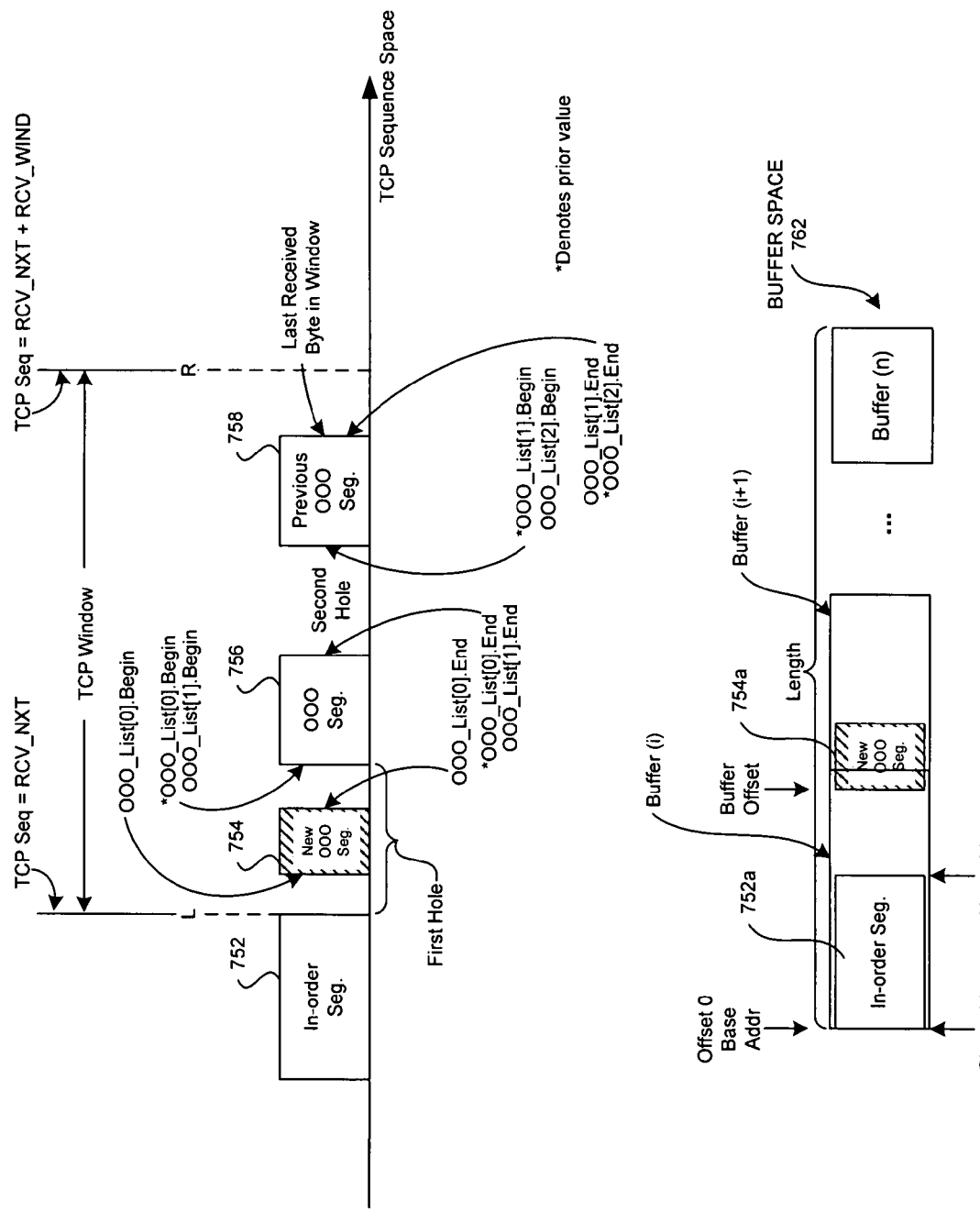
FIG. 7B is a block diagram of exemplary updated variables in accordance with an aspect of the invention.

FIG. 7B is a block diagram the illustrated exemplary updated variables in accordance with an aspect of the invention. Referring to FIG. 7B, there is shown a in-order segment 752, a new out-of-order segment 754, an out-of-order segment 756, a previous out-of-order segment 758. Also illustrated in FIG. 7B is buffer space 762 is the in-order segment 752a and the new out-of order segment 754a. The new out-of-order segment 754a spans a first buffer (i) and a consecutive buffer (i+1). The buffer space 762 has a buffer length L and may be segmented into buffers (i), buffer (I+1), ., buffer (n). The buffer space 762 has a base address (Phy_addr), which is at offset 0, for example. The base address may be any physical address and for convenience, may be designated as offset zero (0). In its current state, the in-order TCP segment is posted with the buffer space 762 starting at the base address, offset zero (0). The variable Nxt_addr denotes the next address where data is to be posted within the buffer space 762 and in this instance, is one byte beyond the end of the in-order TCP segment 752a. In accordance with an embodiment of the invention, a received out-of-order TCP segment may span multiple buffers in the buffer space 762. For example, a received out-of-order TCP segment may span buffer (i) and buffer (i+1). The buffer length may be at least equal to the TCP window size.

With reference to FIG. 7b, in order to reflect the changes, the newly received out-of-order TCP segment 754 becomes the first member in the list of out-of-order TCP segments and its associated variables may be updated accordingly. In a somewhat similar manner, variables associated with the out-of-order TCP segment 756 may also be updated to reflect the fact that out-of-order TCP segment 756 is the second member in the list of out-of-order TCP segments. Previously, the out-of-order TCP segment 756 was the first TCP segment in the list of out-of-order TCP segments. Finally, the out-of-order TCP segment 758 becomes the third member in the list of out-of-order TCP segments and it associated variables may be updated accordingly. Previously, the out-of-order TCP segment 758 was the second out-of-order TCP segment in the list of out-of-order TCP segments. The following table illustrates the previous and updated variables for the newly received out-of-order TCP segment 758, the out-of-order TCP segment 756 and the out-of-order TCP segment 758.

| Variable | Previous Value | Current Value |
| --- | --- | --- |
| New OOO Segment 752 | — | OOO_List[0].Begin |
|  | — | OOO_List[0].End |
| OOO Segment 756 | OOO_List[0].Begin | OOO_List[1].Begin |
|  | OOO_List[0].End | OOO_List[1].End |
| OOO Segment 754 | OOO_List[1].Begin | OOO_List[2].Begin |
|  | OOO_List[1].End | OOO_List[2].End |

Figure 8:
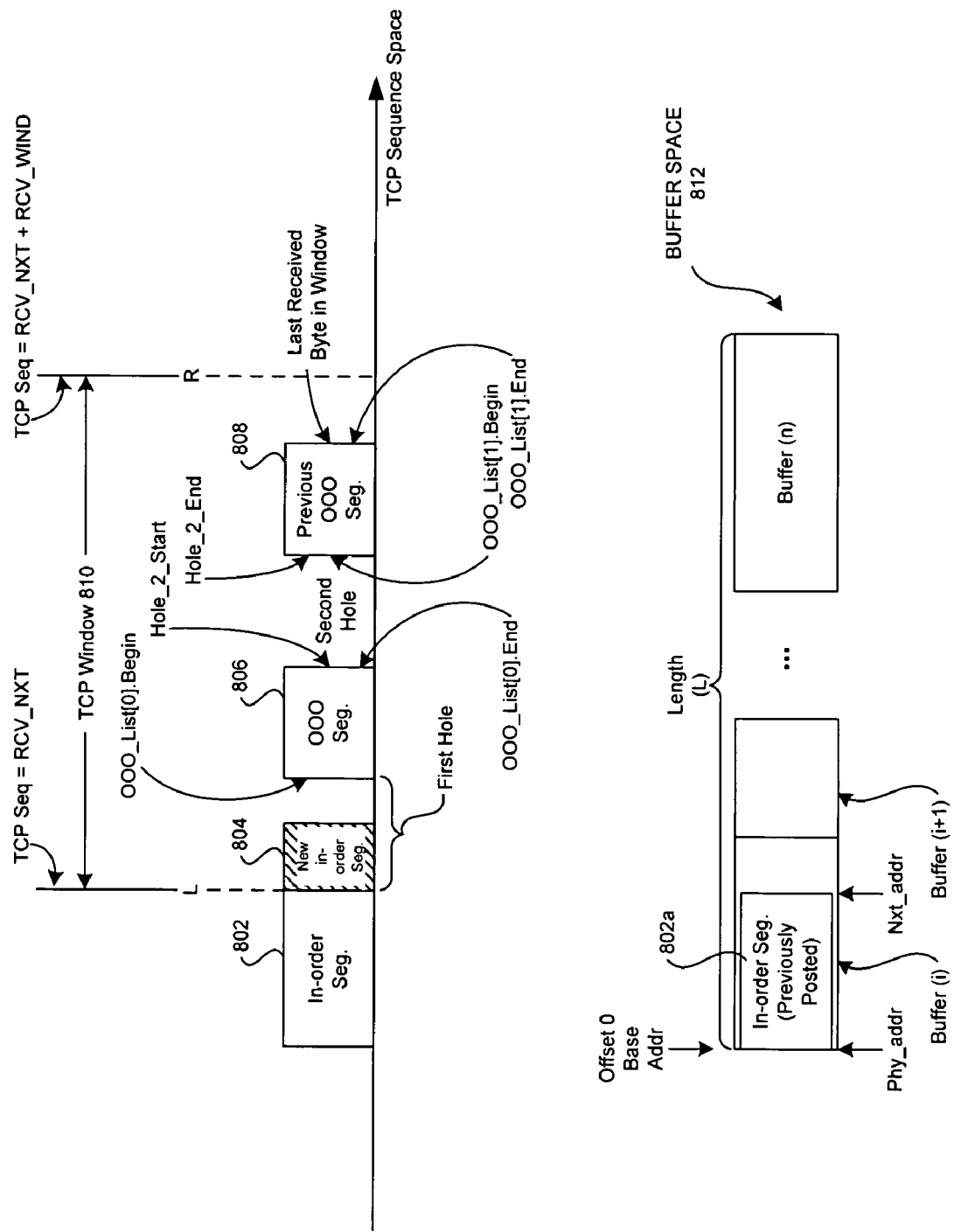
FIG. 8 is a block diagram of a newly received in-order TCP segment within a TCP sequence space and states of exemplary variables and buffers prior to posting that may be utilized in connection with data placement of out-of-order TCP segments or frames in accordance with an embodiment of the invention.

FIG. 8 is a block diagram of a newly received in-order TCP segment within a TCP sequence space and states of exemplary variables and buffers prior to posting that may be utilized in connection with data placement of out-of-order TCP segments or frames in accordance with an embodiment of the invention. Exemplary variables utilized to control the TCP state and the buffer space when data is received in order are illustrated in FIG. 8. These variables are utilized in the pseudo code set forth below. Referring to FIG. 8, there is shown an in-order TCP segment 802, a new in-order TCP segment 804, an out-of-order segment 806, an out-of-order segment 808 and TCP window 810, all of which are located within a TCP sequence space. The newly received in-order TCP segment 804 may be situated adjacent to the in-order segment 802, plugs a leftmost edge of the first hole and aligns with the left edge of the TCP window 810. Accordingly, in an aspect of the invention, the leftmost edge of the out-of-order TCP segment 806 may be assigned the variable OOO_List[0].Begin and the rightmost edge of the out-of-order TCP segment 806 may be assigned the variable OOO_List[0].End. In a somewhat similar manner, the leftmost edge of the previous out-of-order TCP segment 808 may be assigned the variable OOO_List[1].Begin and the rightmost edge of the out-of-order TCP segment 808 may be assigned the variable OOO_List[1].End.

Also shown in FIG. 8 is a corresponding buffer space 812 and an in-order TCP segment 802a. The buffer space 812 has a buffer length L and may be segmented into buffers (i), buffer (I+1), ., buffer (n). The in-order TCP segment 802a corresponds to the in-order TCP segment 802 within the TCP sequence space. The buffer space 812 has a base address (Phy_addr), which is at offset 0, for example. The base address may be any physical address and for convenience, may be designated as offset zero (0). In its current state, the in-order TCP segment is posted with the buffer space 812 starting at the base address, offset zero (0). The variable Nxt_addr denotes the next address where data is to be posted within the buffer space 812 and in this instance, is one byte beyond the end of the in-order TCP segment 802a. In accordance with an embodiment of the invention, a received out-of-order TCP segment may span multiple buffers in the buffer space 812. For example, a received out-of-order TCP segment may span buffer (i) and buffer (I+1). The received out-of-order TCP segment may also span multiple TCP segments. The buffer length may be at least equal to the TCP window size.

Figure 9:
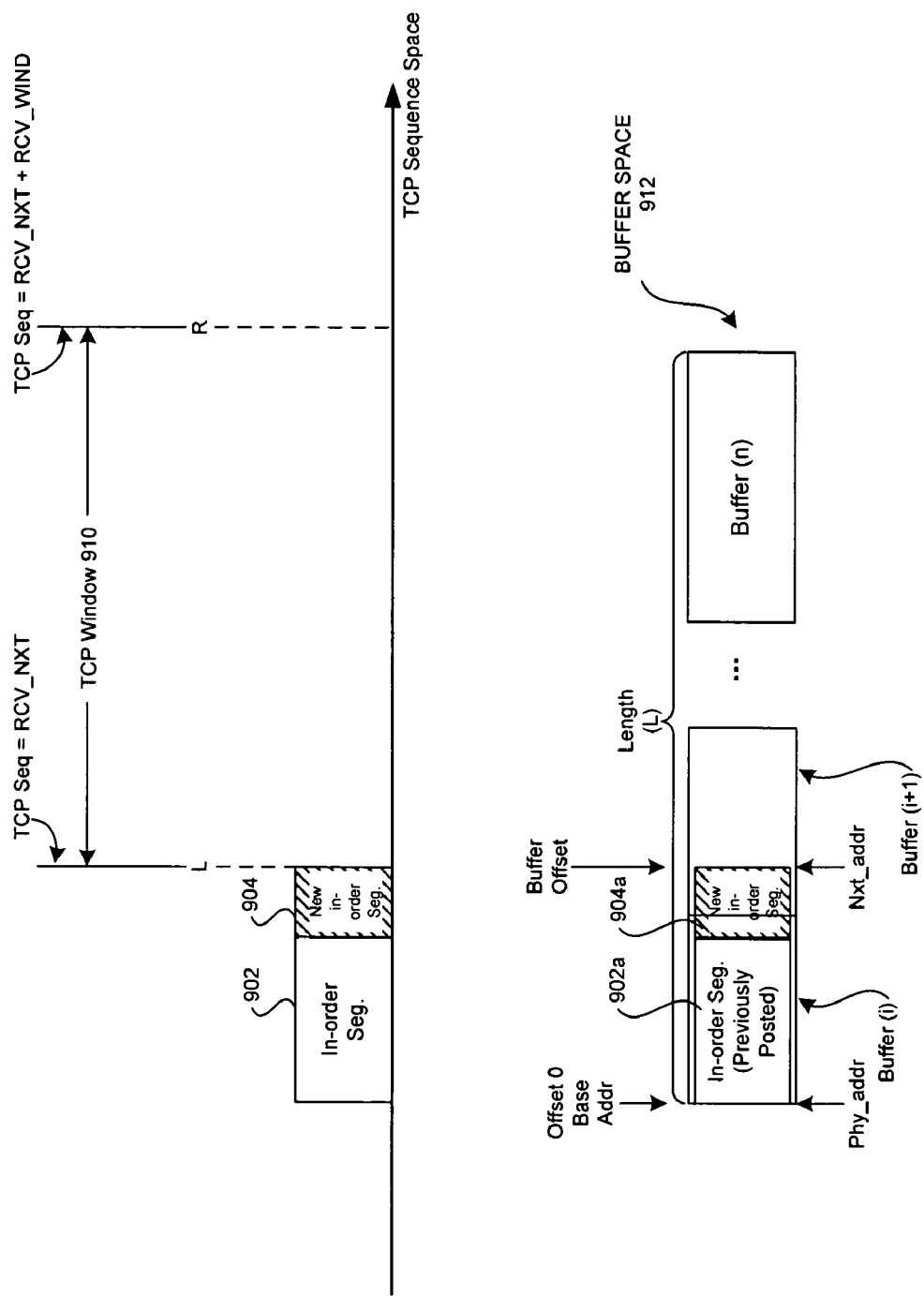
FIG. 9 is a block diagram of a newly received in-order TCP segment within a TCP sequence space and depicts various states of exemplary variables and buffers subsequent to posting and may be utilized in connection with data placement of out-of-order TCP segments or frames in accordance with an embodiment of the invention.

FIG. 9 is a block diagram of a newly received in-order TCP segment within a TCP sequence space and depicts various states of exemplary variables and buffers subsequent to posting and may be utilized in connection with data placement of in-order or out-of-order TCP segments or frames in accordance with an embodiment of the invention. The exemplary variables of FIG. 8 that are utilized to control the TCP state and the buffer space when data is received in order are also illustrated in FIG. 9.

Referring to FIG. 9, there is shown an in-order TCP segment 902, a new in-order TCP segment 904, an out-of-order segment 906, an out-of-order segment 908 and TCP window 910, all of which are located within a TCP sequence space. The newly received in-order TCP segment 904 is placed adjacent to the in-order segment 902, plugs a leftmost edge of the first hole and aligns with the left edge of the TCP window 910. Accordingly, in an aspect of the invention, the leftmost edge or portion of the out-of-order TCP segment 906 may be assigned the variable OOO_List[0].Begin and the rightmost edge or portion of the out-of-order TCP segment 906 may be assigned the variable OOO_List[0].End. The leftmost edge or portion of the previous out-of-order TCP segment 908 may be assigned the variable OOO_List[1].Begin and the rightmost edge or portion of the out-of-order TCP segment 906 may be assigned the variable OOO_List[1].End.

In an aspect of the invention, since the newly received TCP segment 904 is in-order, the newly received TCP segment 904 may be placed adjacent to the in-order TCP segment 902. Accordingly, the TCP window 910 is adjusted so that the rightmost edge of the new in-order TCP segment 904 becomes the leftmost edge of the TCP window 910. In this regard, the window slides from the rightmost edge of the in-order TCP segment 902 to the rightmost edge of the in-order TCP segment 904.

Also shown in FIG. 9 is a corresponding buffer space 912 of buffer length L, an in-order TCP segment 902*a* and a newly received in-order TCP segment 904*a*. The in-order TCP segment 902*a* corresponds to the in-order TCP segment 902 and the TCP segment 904*a* corresponds to the newly received in-order TCP segment 904. In this regard, the in-order TCP segment 902*a* may be referred to as a previously posted in-order TCP segment. The buffer space 912 has a base address (Phy_addr), which is at offset 0, for example. In its current state, the new in-order TCP segment 904*a* may be posted adjacent to the previously posted in-order TCP segment 902*a* starting at the location Nxt_addr as depicted in FIG. 8. Since the newly received in-order TCP segment 904*a* is placed adjacent to the in-order TCP segment 902*a*, then, in this case, after data is posted the next address (Nxt_addr) and the buffer offset are located at the rightmost edge of the newly received in-order TCP segment 904*a*. The next received in-order segment will be posted at Nxt_addr, which in this case, denotes the end of the in-order TCP segments in the buffer space 912. In an aspect of the invention, the new in-order TCP segment 904*a* spans multiple buffers including buffer (i) and buffer (I+1) in the buffer space 912. The other instances, the new in-order TCP segment 904*a* may span multiple TCP segments. Now that buffer (i) is completely full, buffer (i) may be completed to the ULP, the application or whoever provided the buffer to begin with.

Figure 10:
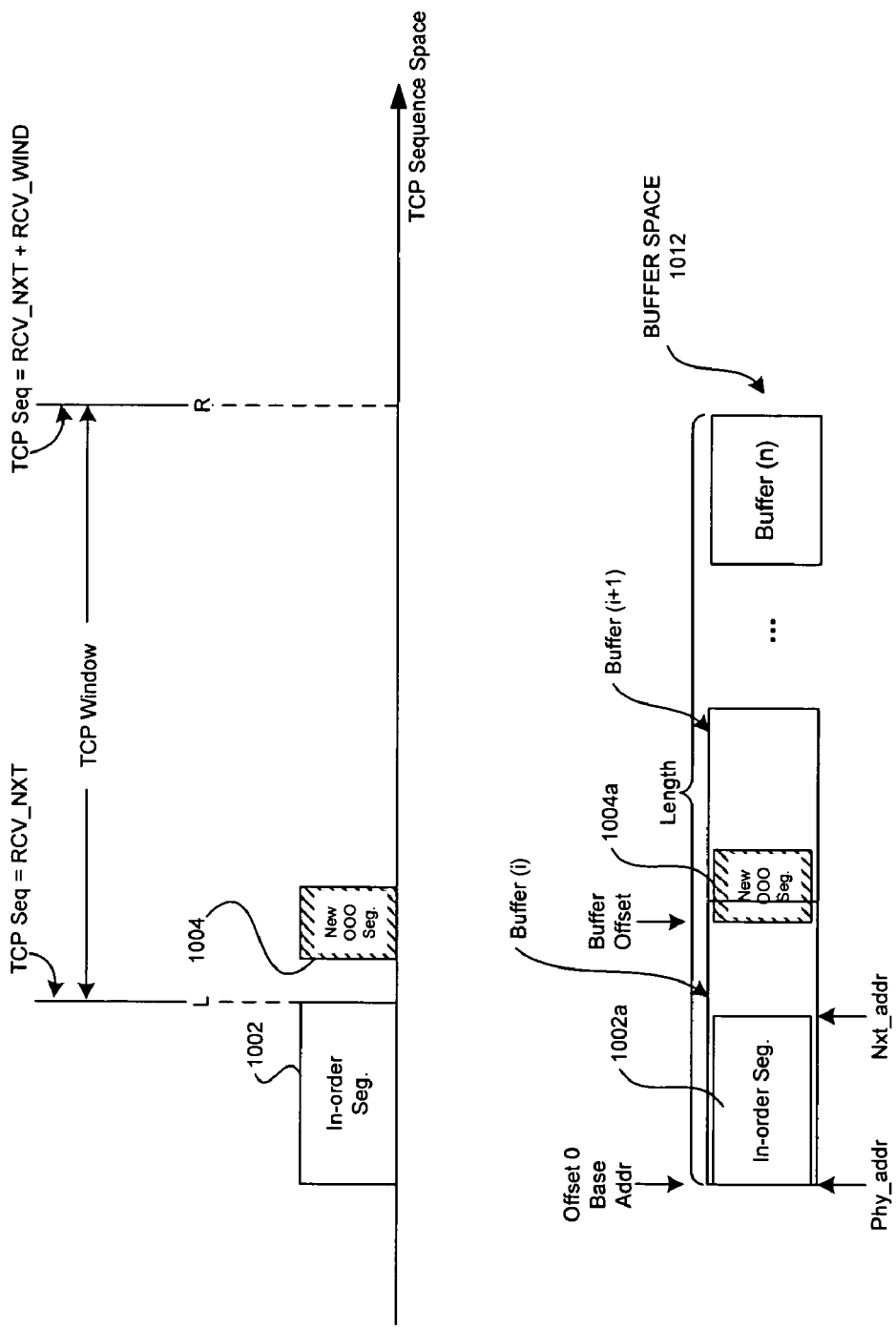
FIG. 10 is an exemplary diagram illustrating processing of a newly received in-order TCP segment within a TCP sequence space and states of exemplary variables and buffers subsequent to posting that may be utilized in connection with data placement of out-of-order TCP segments or frames in accordance with an embodiment of the invention.

FIG. 10 is an exemplary diagram illustrating processing of a newly received out-of-order TCP segment within a TCP sequence space and its buffering in connection with data placement of out-of-order TCP segments or frames in accordance with an embodiment of the invention. Referring to FIG. 10, there is shown an in-order TCP segment 1002 and a new out-of-order TCP segment 1004. The in-order TCP segment 1002*a* in the buffer space 1012 maps to the in-order TCP segment 1002 in the TCP sequence space. In a somewhat similar manner, the newly received out-of-order TCP segment 1004*a* in the buffer space 1012 maps to the out-of-order TCP segment 1004 in the TCP sequence space. The exemplary variables of FIG. 8 that are utilized to control the TCP state and the buffer space when data is received in order are also illustrated in FIG. 10. Referring to FIG. 10, there is shown an in-order TCP segment 1002, a new out-of-order TCP segment 1004, all of which are located within a TCP sequence space. The newly received out-of-order TCP segment 1004 is situated within a portion of the first hole. Accordingly, in an aspect of the invention, the variables that define the out-of-order TCP segment 1006 and previous out-of-order TCP segment 1008 may have to be updated to reflect the location of the newly received out-of-order TCP segment 1004.

FIG. 10 also includes a corresponding buffer space 1012 of buffer length L, an in-order TCP segment 1002*a* and a newly received out-of-order TCP segment 1004*a*. The in-order TCP segment 1002*a* corresponds to the in-order TCP segment 1002 and the newly received in-order TCP segment 1004*a* corresponds to the newly received in-order TCP segment 1004. The buffer space 1012 has a base address (Phy_addr), which is at offset 0, for example. In its current state, the newly received in-order TCP segment 1004*a* is posted starting at a location designated as buffer offset. In this regard, the newly received in-order TCP segment is not placed at the Nxt_addr since it is not an in-order TCP segment. In a case where a new in-order TCP segment is received, it is posted adjacent to the in-order TCP segment 1002*a* starting at Nxt_addr.

In accordance with an embodiment of the invention, it may be assumed that the host provides enough buffers such that the total length of the buffer is always larger than the TCP Window size. However, in instances where the buffers provided by TCP, ULP or the application are not large enough, then the receiver may decide not to accept out-of-order TCP segments that it has no buffer for. In this regard, those out-of-order segments will be dropped by the receiver.

In accordance with another embodiment of the invention, the pseudo code below illustrates an exemplary process that may be utilized to move data from a TCP segment to a buffer list. For simplicity, the pseudo code that covers the handling a PUSH bit or the "no room in current buffer list" is omitted. However, omission of the pseudo code is not intended to limit the invention. Also, the pseudo code assumes a static TCP situation with no receive TCP window update. However, adding code may be done without detracting from the various embodiments of the invention. Additionally, wrap around of the TCP sequence number space is not included in pseudo code. The pseudo code also assumes that no other frame is handled while a current frame is handled. In this regard, the pseudo-code assumes that interrupts are disabled. The pseudo code is as follows:

```
/* global initializations */
Number_of_holes = 0;
OOO_Data {
    Begin Int32;
    End Int32;
```

-continued

```
        ULP_Event_present Boolean;      /* Variable keeps tag of presence
of ULP event in OOO segment */
        ULP_Event_TCP_Sequence_number Int32; /* TCP sequence number for
ULP event */
} OOO_list[I]; /* this list of structure keeps tag of TCP seq number of
segments received o-o-o. Create list of maximal number of holes supported
and init all variables to zero*/
/* RCV_NXT is the TCP sequence number of next byte expected to be
received */
1.      /* The TCP Sequence number range (TCP Seq # of the first byte of
TCP payload is First_TCP_Seq, TCP Sequence # of last byte is
Last_TCP_Seq) is checked to be within RCV window (between RCV_NXT
and RCV_NXT + RCV_Window) */
1A.     /* If frame outside the window (stale or duplicate) drop the frame */
        if ((First_TCP_Seq > (RCV_NXT + RCV_window)) || (Last_TCP_Seq <
RCV_NXT)) then drop_frame( );
1B. /* If some bytes have been received before, ignore duplicate bytes */
        if First_TCP_Seq < RCV_NXT then First_TCP_Seq = RCV_NXT;
1C.     /* In case some bytes are out of the window, the receiver may drop
the whole segment. Here the receiver drops the illegal bytes only */
if Last_TCP_Seq > (RCV_NXT + RCV_window) then Last_TCP_Seq =
(RCV_NXT + RCV_window);
1D.     /* In case last data is o-o-o; do accounting. It may be a new hole or
plug a hole or be adjacent to a hole */
        if First_TCP_Seq > RCV_NXT then Number_of_holes = Hole_accounting( );
1E. /* In case last data is in-order, it may plug a hole */
        if (First_TCP_Seq == RCV_NXT) RCV_NXT = Last_TCP_Seq + 1; /*
update of the RCV_Window is outside the scope of this code */
{
        if ((Number_of_Holes > 0) && (Last_TCP_Seq +1 ==
OOO_list[1].Begin)) then
        {
        /* removes element 1, index of following elements reduced by one */
Remove_OOO_list_element(1);
Number_of_Holes--;
        }
}
2.      /* Find the right entry in the buffer list. Placement is oblivious to the
in-order, out-of-order or part of a hole issue */
Segment_Length = Last_TCP_Seq – First_TCP_Seq;
/* TCP_Delta holds the difference in the TCP sequence number to the
location first byte of the frame. It is also the distance in the buffer space to
the first byte that ought to used to store it */
TCP_Delta = (First_TCP_Seq – RCV_NXT) /* delta from anchor in TCP
space */
i=0;    /* used to dynamically point to the buffer that corresponds
to RCV_NXT */
/* Some bytes of Host_Buffer_List.Buffer[0] may have been used already.
Need to figure out how many are left */
if (TCP_Delta < (Host_Buffer_List.Buffer[0].length –
(Host_Buffer_List.Buffer[0].NXT_Addr –
Host_Buffer_List.Buffer[0].Phy_Addr)))
{
    Buffer_Offset = TCP_Delta + (Host_Buffer_List.Buffer[0].NXT_Addr –
Host_Buffer_List.Buffer[0].Phy_Addr);
}
else
{
Buffer_Offset = TCP_Delta – (Host_Buffer_List.Buffer[0].length –
(Host_Buffer_List.Buffer[0].NXT_Addr –
Host_Buffer_List.Buffer[0].Phy_Addr));
i = 1;
    Do while { Buffer_Offset – (Host_Buffer_List.Buffer[i].length > 0}
    {
        Buffer_Offset –= Host_Buffer_List.Buffer[i].length;
i++;
}
i--;
}
        /* The variable i point to the i-th buffer after the first buffer, where data
posting should start at. Buffer_Offset holds the offset into this buffer */
3.      /* DMA into first buffer, syntax of DMA_Data (from address, to
address, length)
            First buffer is special as placement can start anywhere inside the
buffer */
DMA_Data (@First_TCP_Seq, Host_Buffer_List.Buffer[i].Phy_Address+
Buffer_Offset, Min((Host_Buffer_List.Buffer[i].length–Buffer_Offset),
Segment_Length));
5. /* Complete first buffer to ULP in case data is in order right at first
```

-continued

```
available byte in buffer AND the buffer is full now AND there are no holes in it
and all buffers preceding it (i.e. with data corresponding to lower TCP
sequence numbers) have been completed to the ULP. Note first buffer
contains the left edge of the TCP window i.e. in-order TCP data */
if (i == 0 &&
(Buffer_Offset == Host_Buffer_List.Buffer[0].NXT_Addr) &&
Segment_Length >= (Host_Buffer_List.Buffer[0].length –
(Host_Buffer_List.Buffer[0].NXT_Addr –
Host_Buffer_List.Buffer[0].Phy_Addr))     &&
(OOO_list[0].Begin > 0)     &&
(OOO_list[0].Begin > (First_TCP_Seq +
Min((Host_Buffer_List.Buffer[0].length–Buffer_Offset), Segment_Length))
       {
indicate_buffer_to_ULP(Host_Buffer_List.Buffer[0]);
remove_buffer_from_list (Host_Buffer_List.Buffer[0]); /* following buffer is
now the first */
       }
6.     /* maintain TCP variables. For simplicity will handle RCV_NXT only. It
gets incremented in case data is in order AND a buffer is available */
if (TCP_Delta == 0) RCV_NXT += Segment_Length;
7. /* handle next buffers (for simplicity skip checks for buffer availability).
Introduce temp variables Bytes_to_DMA and Start_TCP_Seq. Note i points
to the buffer following the 1st buffer data has been stored in. In case of in-
order receive, if first buffer (i=0) has been completed and there are more
bytes to be stored, i=0 again but points to the buffer that originally was 2nd */
     Bytes_to_DMA = Segment_Length – Min((Host_Buffer_List.Buffer[i].length–
Buffer_Offset), Segment_Length); /* bytes that have been DMA'd into 1st
buffer */
     Start_TCP_Seq = First_TCP_Seq + Min((Host_Buffer_List.Buffer[i].length–
Buffer_Offset), Segment_Length);
8. /* DMA into next buffers if needed */
     Do while { Bytes_to_DMA > 0}
     {
          DMA data (@Start_TCP_Seq,
Host_Buffer_List.Buffer[i].Phy_Address,
Min((Host_Buffer_List.Buffer[i].length, Bytes_to_DMA)
          Bytes_to_DMA –= Min((Host_Buffer_List.Buffer[i].length,
Bytes_to_DMA;
          Start_TCP_Seq += Min((Host_Buffer_List.Buffer[i].length,
Bytes_to_DMA
          i++;
               If i > max_buffers then no_more_buffers( ); /* exit no buffers
available */
     }
9.
     /* Routine for accounting for in-window TCP data that is received out-of-
order. Builds o-o-o data management structures, returns number of holes */
int32
Hole_accounting( )
{
/* check for no duplicate of o-o-o data. Data can re-write it in buffer (as
content is guaranteed by TCP to be identical) or to save DMA cycles can
write into buffer just the receive data that has not been previously received).
Below just new data is being written to buffer (except for case where new
frame fully overlaps existing hole from both ends */
I = 0;
Do while (Number_of_Holes > I)
{
     /* For simplicity of the pseudo code the case where one TCP segment
overlaps more than one hole is not discussed here. However it is a simple
extrapolation of the code below */
          /* if new hole on left side of element I, allocate space to manage it */
          If ((Last_TCP_Seq+1) < OOO_list[I].Begin) then
          {
          /* insert element I before original element I, push original I and
subsequent elements 1 up */
               Insert_OOO_list_element(I);
          OOO_list[I].Begin = First_TCP_Seq;
          OOO_list[I].End = Last_TCP_Seq;
          return (Number_of_Holes++);
          }
          If ((Last_TCP_Seq+1) == OOO_list[I].Begin)) then OOO_list[I].Begin =
First_TCP_Seq;
Else If ((First_TCP_Seq < (OOO_list[I].Begin) && (Last_TCP_Seq >
(OOO_list[I].Begin) && (Last_TCP_Seq <= (OOO_list[I].End)) then
Last_TCP_seq = (OOO_list[I].Begin
Else If ((First_TCP_Seq >= (OOO_list[I].Begin) && (Last_TCP_Seq <=
(OOO_list[I].End)) then drop_frame( );
Else If ((First_TCP_Seq >= (OOO_list[I].Begin) && (First_TCP_Seq <
```

-continued

```
(OOO_list[I].End) && (Last_TCP_Seq > (OOO_list[I].End) then
First_TCP_seq = (OOO_list[I].End
        /* Is this data adjacent to existing hole from right? Move edge of hole. Is the
hole plugged now? */
        If ((First_TCP_Seq == OOO_list[I].End+1)          then OOO_list[I].End
= Last_TCP_Seq;
        If ((OOO_list[I].End +1) == OOO_list[I+1].Begin) then
        {
        OOO_list[I].End = OOO_list[I+1].End;
        /* removes element I+1, (reset to zero its variables) index of following
elements reduced by one */
        Remove_OOO_list_element(I+1);
        return (Number_of_Holes--);
        }
        /* Is the hole plugged now from left? */
        If (OOO_list[I].Begin == OOO_list[I-1].End +1) then
        {
        OOO_list[I-1].End = OOO_list[I].End;
        /* removes element I, index of following elements reduced by one */
        Remove_OOO_list_element(I);
        return (Number_of_Holes--);
        }
        /* if new hole on right side of element I, allocate space to manage it */
        If ((First_TCP_Seq+1) > OOO_list[I].End) && (Last_TCP_Seq <
OOO_list[I+1])) then
        {
        /* insert element I+1 after original element I, push original I+1 and
subsequent elements 1 up */
        Insert_OOO_list_element(I+1);
        OOO_list[I+1].Begin = First_TCP_Seq;
        OOO_list[I+1].End = Last_TCP_Seq;
        return (Number_of_Holes++);
        }
        I++;
    }
}
```

Accordingly, the present invention may be realized in hardware, software, or a combination of hardware and software. The present invention may be realized in a centralized fashion in one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for handling out-of-order TCP segments, the method comprising:

one or both of placing a first received TCP segment in a host buffer and/or having a mapping between a TCP sequence number and a corresponding buffer address;

determining whether a second received TCP segment is one of an in-order TCP segment or an out-of-order TCP segment;

if the second received TCP segment is an out-of-order TCP segment:

storing control information associated with at least said second TCP segment locally on a network interface card (NIC); and placing said out-of-order TCP segment in a portion of said host buffer;

recording at least a buffer address occupied by an end of said first received TCP segment on said NIC, said buffer being one or more of a TCP buffer, an ULP buffer and/or an application buffer; and if said second received TCP segment is an in-order TCP segment:

placing said in-order TCP segment adjacent to said first received TCP segment in said host buffer;

placing said in-order TCP segment starting from an address adjacent to said recorded address occupied by said end of said first received TCP segment in said host buffer; and one or both of:
recording by said NIC, one or more of data indicating:
an end buffer address occupied by an end of said in-order TCP segment;
a start buffer address plus a length of a data portion of said in-order TCP segment; and
a buffer address of a byte following an end of said in-order TCP segment; and
storing on said NIC, control information associated with at least one of said indicating data.

2. A method for handling out-of-order TCP segments, the method comprising:
one or both of placing a first received TCP segment in a host buffer and/or having a mapping between a TCP sequence number and a corresponding buffer address;
determining whether a second received TCP segment is one of an in-order TCP segment or an out-of-order TCP segment;
if the second received TCP segment is an out-of-order TCP segment:
storing control information associated with at least said second TCP segment locally on a network interface card (NIC); and
placing said out-of-order TCP segment in a portion of said host buffer; and
one or both of:
recording on said NIC,
one or both of data indicating:
an address occupied by a start of said placed out-of-order TCP segment and an address occupied by an end of said placed out-of-order TCP segment; and
a start buffer address plus a length occupied by said placed out-of-order TCP segment; and
storing on said NIC, control information associated with said indicating data on said NIC.

3. The method according to claim 2, comprising receiving a third out-of-order TCP segment by said NIC.

4. The method according to claim 3, comprising determining placement in said host buffer of said third received out-of-order TCP segment by said NIC.

5. The method according to claim 3, comprising:
if said third received out-of-order TCP segment is in-order with said placed out-of-order TCP segment:
placing said third out-of-order TCP segment adjacent to said placed out-of-order TCP segment in said host buffer; and
one or both of:
adjusting said start address occupied by said placed out-of-order TCP segment to become a start address of a combined said third out-of-order TCP segment and said out-of-order TCP segment; and
adjusting said end address occupied by said placed out-of-order TCP segment to become an end address of said combined said third out-of-order TCP segment and said out-of-order TCP segment.

6. The method according to claim 3, comprising if said third received out-of-order TCP segment is out-of-order with respect to said placed out-of-order TCP segment, placing said third out-of-order TCP segment at an address in said host buffer that is one of located before said placed out-of-order TCP segment and located after said placed out-of-order TCP segment.

7. The method according to claim 6, comprising one or both of:
recording on said NIC, one or more of location date representing:
a start address and an end address of a location where said third received TCP segment is placed in said host buffer on said NIC;
a start address plus a length of where said third received TCP segment is placed in said host buffer on said NIC; and
a byte following an end of where said third received TCP segment is placed in said host buffer on said NIC; and
storing on said NIC, control information associated with at least said location data of where said third received TCP segment is placed.

8. A method for handling out-of-order TCP segments, the method comprising:
one or more of placing a first received TCP segment in a host buffer and/or having a mapping between a TCP sequence number and a corresponding buffer address;
determining whether a second received TCP segment is one of an in-order TCP segment or an out-of-order TCP segment;
if the second received TCP segment is an out-of-order TCP segment:
storing control information associated with at least said second TCP segment locally on a network interface card (NIC); and
placing said out-of-order TCP segment in a portion of said host buffer;
adjusting a TCP window to an end of said last in order received TCP segment upon said placing of said first received TCP segment in said host buffer; and
one or both of:
adjusting a left edge of said TCP window to a next byte immediately following an end of an out-of-order TCP segment placed adjacent to an end of a last in-order previously received TCP segment; and
adjusting said left edge of said TCP window to a next byte immediately following an end of a last of a plurality of out-of-order TCP segments placed adjacent to an end of a last in-order previously received TCP segment.

9. A method for handling out-of-order TCP segments, the method comprising:
one or both of placing a first received TCP segment in a host buffer and/or having a mapping between a TCP sequence number and a corresponding buffer address;
determining whether a second received TCP segment is one of an in-order TCP segment or an out-of-order TCP segment;
if the second received TCP segment is an out-of-order TCP segment:
storing control information associated with at least said second TCP segment locally on a network interface card (NIC); and
placing said out-of-order TCP segment in a portion of said host buffer;
adjusting a TCP window to an end of said last in order received TCP segment upon said placing of said first received TCP segment in said host buffer; and
adjusting a left edge of TCP window to the next byte immediately following an end of a last in-order TCP segment placed adjacent to said first received TCP segment.

10. The method according to claim 9, comprising storing control information associated with at least a location of said TCP window on said NIC.

11. The method according to claim 10, comprising updating said stored control information associated with at least a location of said TCP window whenever said TCP window is adjusted.

12. A method for networking, the method comprising:
one or both of placing a first received TCP segment in a host buffer and/or having a mapping between a TCP sequence number and a corresponding buffer address;
determining whether a second received TCP segment is one of an in-order TCP segment or an out-of-order TCP segment;
if the second received TCP segment is an out-of-order TCP segment:
storing control information associated with at least said second TCP segment locally on a network interface card (NIC); and
placing said out-of-order TCP segment in a portion of said host buffer;
computing a buffer address in a first buffer for a location of a first byte of data for a first TCP segment;
computing a buffer address for said first data byte in a second TCP segment based on a buffer address that corresponds to a TCP segment number of said second TCP segment; and
computing an offset from the said TCP segment number that corresponds to said first TCP segment to a first byte of said second TCP segment for handling out-of-order TCP segment.

13. The method according to claim 12, comprising determining whether said computed offset is larger than a length of said first buffer.

14. The method according to claim 13, comprising if said computed offset is larger than said length of said first buffer, subtracting said length of said first buffer from said computed offset resulting in a new offset.

15. The method according to claim 14, comprising subtracting a length of a second buffer from said new offset.

16. The method according to claim 15, comprising if said subtracting of said second buffer results in said new offset being less than a length of said second buffer, buffering data for said second TCP segment in said first buffer and said second buffer.

17. The method according to claim 16, comprising if said new offset is greater than a length of said second buffer, subtracting a length of other buffers until one of:
said buffers are exhausted; and
a remaining offset is less than a length of a current buffer.

18. The method according to claim 17, comprising if a remaining offset is less than a length of said current buffer, buffering data for said second TCP segment in said second buffer, said third buffer, and said other buffers.

19. The method according to claim 17, comprising if said buffers are exhausted, dropping said second TCP segment.

20. A computer readable medium, stored with, embodied with or encoded with a computer program or computer executable instructions for handling out-of-order TCP segments, the at least one code section being executable by a machine for causing the machine to perform steps comprising:
one or both of placing a first received TCP segment in a host buffer and/or having a mapping between a TCP sequence number and a corresponding buffer address;
determining whether a second received TCP segment is one of an in-order TCP segment or an out-of-order TCP segment;
if said second received TCP segment is an out-of-order TCP segment:
storing control information associated with at least said second TCP segment locally on a network interface card (NIC); and
placing said out-of-order TCP segment in a portion of said host buffer;
recording at least a buffer address occupied by an end of said first received TCP segment on said NIC, said buffer being one of a TCP buffer, ULP buffer and an application buffer;
placing said in-order TCP segment adjacent to said first received TCP segment in said host buffer if said second received TCP segment is an in-order TCP segment;
placing said in-order TCP segment starting from an address adjacent to said recorded address occupied by said end of said first received TCP segment in said host buffer; and
one or both of:
recording by said NIC, at least one of data indicating:
an end buffer address occupied by an end of said in-order TCP segment;
a start buffer address plus a length of a data portion of said in-order TCP segment; and
a buffer address of a byte following an end of said in-order TCP segment; and
storing on said NIC, control information associated with at least one of said indicating.

21. A computer readable medium, stored with, embodied with or encoded with a computer program or computer executable instructions for handling out-of-order TCP segments, the at least one code section being executable by a machine for causing the machine to perform steps comprising:
one or both of placing a first received TCP segment in a host buffer and/or having a mapping between a TCP sequence number and a corresponding buffer address;
determining whether a second received TCP segment is one of an in-order TCP segment or an out-of-order TCP segment;
if said second received TCP segment is an out-of-order TCP segment:
storing control information associated with at least said second TCP segment locally on a network interface card (NIC); and
placing said out-of-order TCP segment in a portion of said host buffer; and
one or both of:
recording on said NIC, one or both of data indicating:
an address occupied by a start of said placed out-of-order TCP segment and an address occupied by an end of said placed out-of-order TCP segment; and
a start buffer address plus a length occupied by said placed out-of-order TCP segment; and
storing on said NIC, control information associated with said indicating data on said NIC.

22. The computer readable medium according to claim 21, comprising code for receiving a third out-of-order TCP segment by said NIC.

23. The computer readable medium according to claim 22, comprising code for determining placement in said host buffer of said third received out-of-order TCP segment by said NIC.

24. The computer readable medium according to claim 22, comprising:
code for placing said third out-of-order TCP segment adjacent to said placed out-of-order TCP segment in said host buffer if said third received out-of-order TCP segment is in-order with said placed out-of-order TCP segment; and one or both of:

code for adjusting said start address occupied by said placed out-of-order TCP segment to become a start address of a combined said third out-of-order TCP segment and said out-of-order TCP segment; and code for adjusting said end address occupied by said placed out-of-order TCP segment to become an end address of said combined said third out-of-order TCP segment and said out-of-order TCP segment.

25. The computer readable medium according to claim 22, comprising code for placing said third out-of-order TCP segment at an address in said host buffer that is one of located before said placed out-of-order TCP segment and located after said placed out-of-order TCP segment if said third received out-of-order TCP segment is out-of-order with respect to said placed out-of-order TCP segment.

26. The computer readable medium according to claim 25, comprising one or both of:

code for recording on said NIC, one or more of location data representing:

a start address and an end address of a location where said third received TCP segment is placed in said host buffer on said NIC;

a start address plus a length of where said third received TCP segment is placed in said host buffer on said NIC; and a byte following an end of where said third received TCP segment is placed in said host buffer on said NIC; and code for storing on said NIC, control information associated with at least said location data of where said third received TCP segment is placed.

27. A computer readable medium, stored with, embodied with or encoded with a computer program or computer executable instructions for handling out-of-order TCP segments, the at least one code section being executable by a machine for causing the machine to perform steps comprising:

one or both of placing a first received TCP segment in a host buffer and/or having a mapping between a TCP sequence number and a corresponding buffer address;

determining whether a second received TCP segment is one of an in-order TCP segment or an out-of-order TCP segment;

if said second received TCP segment is an out-of-order TCP segment:

storing control information associated with at least said second TCP segment locally on a network interface card (NIC); and placing said out-of-order TCP segment in a portion of said host buffer;

adjusting a TCP window to an end of said last in order received TCP segment upon said placing of said first received TCP segment in said host buffer; and one or both of:

adjusting a left edge of said TCP window to a next byte immediately following an end of an out-of-order TCP segment placed adjacent to an end of a last in-order previously received TCP segment; and adjusting said left edge of said TCP window to a next byte immediately following an end of a last of a plurality of out-of-order TCP segments placed adjacent to an end of a last in-order previously received TCP segment.

28. A computer readable medium, stored with, embodied with or encoded with a computer program or computer executable instructions for handling out-of-order TCP segments, the at least one code section being executable by a machine for causing the machine to perform steps comprising:

one or both of placing a first received TCP segment in a host buffer and/or having a mapping between a TCP sequence number and a corresponding buffer address;

determining whether a second received TCP segment is one of an in-order TCP segment or an out-of-order TCP segment;

if said second received TCP segment is an out-of-order TCP segment:

storing control information associated with at least said second TCP segment locally on a network interface card (NIC); and placing said out-of-order TCP segment in a portion of said host buffer;

adjusting a TCP window to an end of said last in order received TCP segment upon said placing of said first received TCP segment in said host buffer; and adjusting a left edge of TCP window to the next byte immediately following an end of a last in-order TCP segment placed adjacent to said first received TCP segment.

29. The computer readable medium according to claim 28, comprising code for storing control information associated with at least a location of said TCP window on said NIC.

30. The computer readable medium according to claim 29, comprising code for updating said stored control information associated with at least a location of said TCP window whenever said TCP window is adjusted.

31. A computer readable medium, stored with, embodied with or encoded with a computer program or computer executable instructions for networking, the at least one code section being executable by a machine for causing the machine to perform steps comprising:

one or both of placing a first received TCP segment in a host buffer and/or having a mapping between a TCP sequence number and a corresponding buffer address;

determining whether a second received TCP segment is one of an in-order TCP segment or an out-of-order TCP segment;

if said second received TCP segment is an out-of-order TCP segment:

storing control information associated with at least said second TCP segment locally on a network interface card (NIC); and placing said out-of-order TCP segment in a portion of said host buffer;

computing a buffer address in a first buffer for a location of a first byte of data for a first TCP segment;

computing a buffer address for said first data byte in a second TCP segment based on a buffer address that corresponds to a TCP segment number of said second TCP segment; and computing an offset from the said TCP segment number that corresponds to said first TCP segment to a first byte of said second TCP segment for handling out-of-order TCP segment.

32. The computer readable medium according to claim 31, comprising code for determining whether said computed offset is larger than a length of said first buffer.

33. The computer readable medium according to claim 32, comprising code for subtracting said length of said first buffer from said computed offset resulting in a new offset if said computed offset is larger than said length of said first buffer.

34. The computer readable medium according to claim 31, comprising code for subtracting a length of a second buffer from said new offset.

35. The computer readable medium according to claim 34, comprising code for buffering data for said second TCP segment in said first buffer and said second buffer if said subtracting of said second buffer results in said new offset being less than a length of said second buffer.

36. The computer readable medium according to claim 35, comprising code for subtracting a length of other buffers until one of:
   said buffers are exhausted; and
   a remaining offset is less than a length of a current buffer, if said new offset is greater than a length of said second buffer.

37. The computer readable medium according to claim 36, comprising code for buffering data for said second TCP segment in said second buffer, said third buffer, and said other buffers if a remaining offset is less than a length of said current buffer.

38. The computer readable medium according to claim 36, comprising code for dropping said second TCP segment if said buffers are exhausted.

39. A system for handling out-of-order TCP segments, the system comprising:
   at least one processor for one or both of placing a first received TCP segment in a host buffer and/or having a mapping between a TCP sequence number and a corresponding buffer address;
   said at least one processor determines whether a second received TCP segment is one of an in-order TCP segment or an out-of-order TCP segment;
   if said second received TCP segment is an out-of-order TCP segment:
      said at least one processor stores control information associated with at least said second TCP segment locally on a network interface card (NIC); and
      said at least one processor places said out-of-order TCP segment in a portion of said host buffer;
   said at least one processor records at least a buffer address occupied by an end of said first received TCP segment on said NIC, said buffer being one of a TCP buffer, ULP buffer and an application buffer;
   said at least one processor places said in-order TCP segment adjacent to said first received TCP segment in said host buffer if said second received TCP segment is an in-order TCP segment;
   said at least one processor places said in-order TCP segment starting from an address adjacent to said recorded address occupied by said end of said first received TCP segment in said host buffer; and
   said at least one processor performs one or both of:
      records by said NIC, one or more of data indicating:
         an end buffer address occupied by an end of said in-order TCP segment;
         a start buffer address plus a length of a data portion of said in-order TCP segment; and
         a buffer address of a byte following an end of said in-order TCP segment; and
      stores on said NIC, control information associated with at least one of said indicating.

40. The system according to claim 39, wherein said at least one processor performs one or both of:
   records on said NIC, one or both of data indicating:
      an address occupied by a start of said placed out-of-order TCP segment and an address occupied by an end of said placed out-of-order TCP segment; and
      a start buffer address plus a length occupied by said placed out-of-order TCP segment; and
   stores on said NIC, control information associated with said indicating data on said NIC.

41. The system according to claim 40, wherein said at least one processor receives a third out-of-order TCP segment by said NIC.

42. The system according to claim 41, wherein said at least one processor determines placement in said host buffer of said third received out-of-order TCP segment by said NIC.

43. The system according to claim 41, wherein said at least one processor places said third out-of-order TCP segment adjacent to said placed out-of-order TCP segment in said host buffer,
   if said third received out-of-order TCP segment is in-order with said placed out-of-order TCP segment; and
   one or both of:
      adjusts said start address occupied by said placed out-of-order TCP segment to become a start address of a combined said third out-of-order TCP segment and said out-of-order TCP segment; and
      adjusts said end address occupied by said placed out-of-order TCP segment to become an end address of said combined said third out-of-order TCP segment and said out-of-order TCP segment.

44. The system according to claim 41, wherein said at least one processor places said third out-of-order TCP segment at an address in said host buffer that is one of located before said placed out-of-order TCP segment and located after said placed out-of-order TCP segment if said third received out-of-order TCP segment is out-of-order with respect to said placed out-of-order TCP segment.

45. The system according to claim 44, wherein said at least one processor performs one or both of:
   records on said NIC, one or more of location data representing:
      a start address and an end address of a location where said third received TCP segment is placed in said host buffer on said NIC;
      a start address plus a length of where said third received TCP segment is placed in said host buffer on said NIC; and
      a byte following an end of where said third received TCP segment is placed in said host buffer on said NIC; and
   stores on said NIC, control information associated with at least said location data of where said third received TCP segment is placed.

46. A system for handling out-of-order TCP segments, the system comprising:
   at least one processor that performs one or both of placing a first received TCP segment in a host buffer and/or having a mapping between a TCP sequence number and a corresponding buffer address;
   said at least one processor determines whether a second received TCP segment is one of an in-order TCP segment or an out-of-order TCP segment;
   if said second received TCP segment is an out-of-order TCP segment:
      said at least one processor stores control information associated with at least said second TCP segment locally on a network interface card (NIC); and said at least one processor places said out-of-order TCP segment in a portion of said host buffer;

said at least one processor adjusts a TCP window to an end of said last in order received TCP segment upon said placing of said first received TCP segment in said host buffer; and said at least one processor performs one or both of:
  adjusts a left edge of said TCP window to a next byte immediately following an end of an out-of-order TCP segment placed adjacent to an end of a last in-order previously received TCP segment; and
  adjusts said left edge of said TCP window to a next byte immediately following an end of a last of a plurality of out-of-order TCP segments placed adjacent to an end of a last in-order previously received TCP segment.

47. A system for handling out-of-order TCP segments, the system comprising:
  at least one processor that performs one or both of placing a first received TCP segment in a host buffer and/or having a mapping between a TCP sequence number and a corresponding buffer address;
  said at least one processor determines whether a second received TCP segment is one of an in-order TCP segment or an out-of-order TCP segment;
  if said second received TCP segment is an out-of-order TCP segment:
    said at least one processor stores control information associated with at least said second TCP segment locally on a network interface card (NIC); and
    said at least one processor places said out-of-order TCP segment in a portion of said host buffer;
  said at least one processor adjusts a TCP window to an end of said last in order received TCP segment upon said placing of said first received TCP segment in said host buffer; and
  said at least one processor adjusts a left edge of TCP window to the next byte immediately following an end of a last in-order TCP segment placed adjacent to said first received TCP segment.

48. The system according to claim 47, wherein said at least one processor stores control information associated with at least a location of said TCP window on said NIC.

49. The system according to claim 48, wherein said at least one processor updates said stores control information associated with at least a location of said TCP window whenever said TCP window is adjusted.

50. A system for networking, the system comprising:
  at least one processor that performs one or both of placing a first received TCP segment in a host buffer and/or having a mapping between a TCP sequence number and a corresponding buffer address;
  said at least one processor determines whether a second received TCP segment is one of an in-order TCP segment or an out-of-order TCP segment;
  if said second received TCP segment is an out-of-order TCP segment:
    said at least one processor stores control information associated with at least said second TCP segment locally on a network interface card (NIC); and
    said at least one processor places said out-of-order TCP segment in a portion of said host buffer,
  wherein said at least one processor:
    computes a buffer address in a first buffer for a location of a first byte of data for a first TCP segment;
    computes a buffer address for said first data byte in a second TCP segment based on a buffer address that corresponds to a TCP segment number of said second TCP segment; and
    computes an offset from the said TCP segment number that corresponds to said first TCP segment to a first byte of said second TCP segment for handling out-of-order TCP segment.

51. The system according to claim 50, wherein said at least one processor determines whether said computed offset is larger than a length of said first buffer.

52. The system according to claim 51, wherein said at least one processor subtracts said length of said first buffer from said computed offset resulting in a new offset if said computed offset is larger than said length of said first buffer.

53. The system according to claim 52, wherein said at least one processor subtracts a length of a second buffer from said new offset.

54. The system according to claim 53, wherein said at least one processor buffers data for said second TCP segment in said first buffer and said second buffer if said subtracting of said second buffer results in said new offset being less than a length of said second buffer.

55. The system according to claim 54, wherein said at least one processor subtracts a length of other buffers until one or both of:
  said buffers are exhausted; and/or
  a remaining offset is less than a length of a current buffer if said new offset is greater than a length of said second buffer.

56. The system according to claim 55, wherein said at least one processor buffers data for said second TCP segment in said second buffer, said third buffer, and said other buffers if a remaining offset is less than a length of said current buffer.

57. The system according to claim 55, wherein said at least one processor drops said second TCP segment if said buffers are exhausted.

* * * * *